US009020726B2

(12) United States Patent
Boeckenhoff et al.

(10) Patent No.: US 9,020,726 B2
(45) Date of Patent: Apr. 28, 2015

(54) VEHICLE TORQUE MANAGEMENT

(75) Inventors: Elmar Boeckenhoff, Portland, OR (US); Dieter Reckels, Schorndorf (DE); Derek James Rotz, Portland, OR (US); Shivkumar Duraiswamy, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 1517 days.

(21) Appl. No.: 12/612,536

(22) Filed: Nov. 4, 2009

(65) Prior Publication Data

US 2011/0106388 A1 May 5, 2011

(51) Int. Cl.
G06F 19/00 (2011.01)
B60W 10/06 (2006.01)
B60W 30/188 (2012.01)
B60W 40/072 (2012.01)
B60W 40/076 (2012.01)
B60W 40/13 (2012.01)
B60W 50/12 (2012.01)

(52) U.S. Cl.
CPC ........... *B60W 10/06* (2013.01); *B60W 30/1882* (2013.01); *B60W 40/072* (2013.01); *B60W 40/076* (2013.01); *B60W 40/13* (2013.01); *B60W 50/12* (2013.01); *B60W 2530/14* (2013.01); *B60W 2550/142* (2013.01); *B60W 2550/143* (2013.01); *B60W 2710/0666* (2013.01)

(58) Field of Classification Search
CPC ................. B60W 2510/0657; B60W 2530/10; B60W 2550/142; B60W 10/06
USPC ..................................... 701/70, 102
See application file for complete search history.

(56) References Cited

U.S. PATENT DOCUMENTS

| 5,774,820 | A | 6/1998 | Linden et al. |
| 5,832,400 | A | 11/1998 | Takahashi et al. |
| 5,995,895 | A | 11/1999 | Watt et al. |
| 6,021,370 | A | 2/2000 | Bellinger et al. |
| 6,167,357 | A | 12/2000 | Zhu et al. |
| 6,349,253 | B1 | 2/2002 | Bellinger |
| 6,387,011 | B1 | 5/2002 | Bellinger |
| 6,436,005 | B1 | 8/2002 | Bellinger |
| 6,470,257 | B1 | 10/2002 | Seto |
| 6,701,903 | B1 | 3/2004 | Collins et al. |
| 6,814,688 | B2 | 11/2004 | Foelsche et al. |
| 6,819,995 | B2 | 11/2004 | Bellinger |
| 6,836,719 | B2 | 12/2004 | Andersson et al. |
| 6,839,619 | B2 | 1/2005 | Bellinger |
| 6,981,486 | B2 * | 1/2006 | Yone et al. ................... 123/399 |
| 7,347,168 | B2 | 3/2008 | Reckels et al. |

(Continued)

*Primary Examiner* — John Q Nguyen
*Assistant Examiner* — Kyung Kim
(74) *Attorney, Agent, or Firm* — Klarquist Sparkman, LLP

(57) ABSTRACT

A torque management system and method is described by which the torque provided by an engine can be controlled based on a mass of the vehicle and, if available, instantaneous and/or predictive slope information. Also, in some modes of operation, torque can be controlled based on speed limit information for upcoming road segments to be traveled by a vehicle. In addition to controlling the maximum allowable torque, optionally the minimum allowable torque can also be controlled to prevent inadvertent decelerations of the vehicle. A driver/operator can optionally override the torque control and the history of override requests can optionally be used to adjust overrides of the system. A plurality of torque control approach sub-methods can be made available with the appropriate sub-mode being selected depending, for example, upon the extent of the available information.

39 Claims, 15 Drawing Sheets

(56) References Cited

U.S. PATENT DOCUMENTS

| | | |
|---|---|---|
| 2003/0221886 A1 | 12/2003 | Petrie, Jr. |
| 2004/0167705 A1 | 8/2004 | Lingman et al. |
| 2005/0085966 A1 | 4/2005 | Eriksson et al. |
| 2006/0116806 A1 | 6/2006 | Steen et al. |
| 2007/0067087 A1 | 3/2007 | Ohshima |
| 2007/0112475 A1 | 5/2007 | Koebler et al. |

* cited by examiner

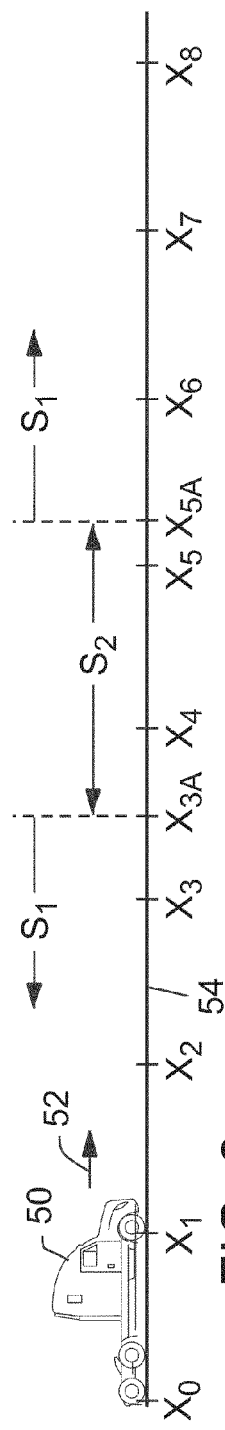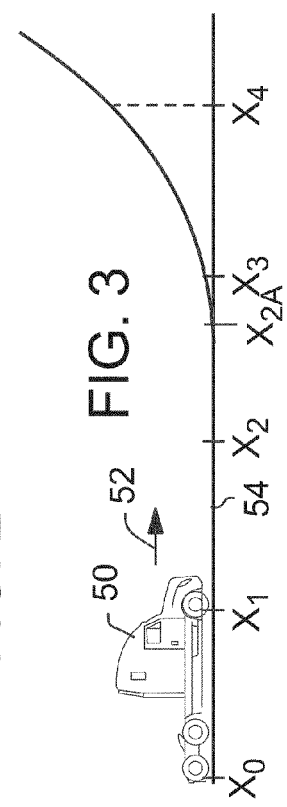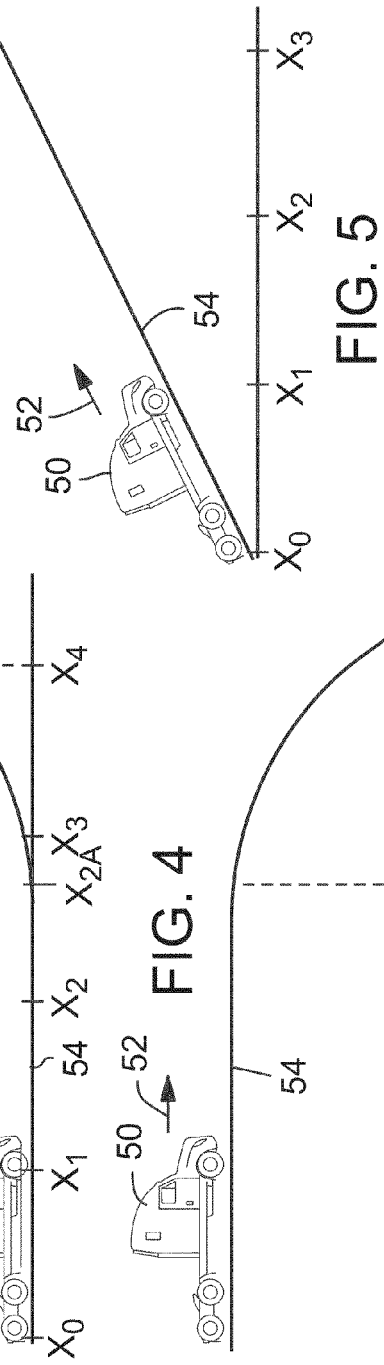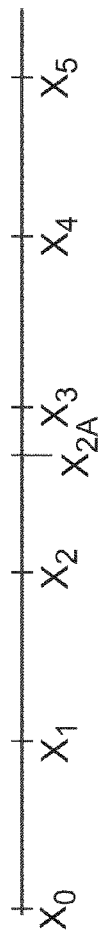
FIG. 2
FIG. 3
FIG. 4
FIG. 5

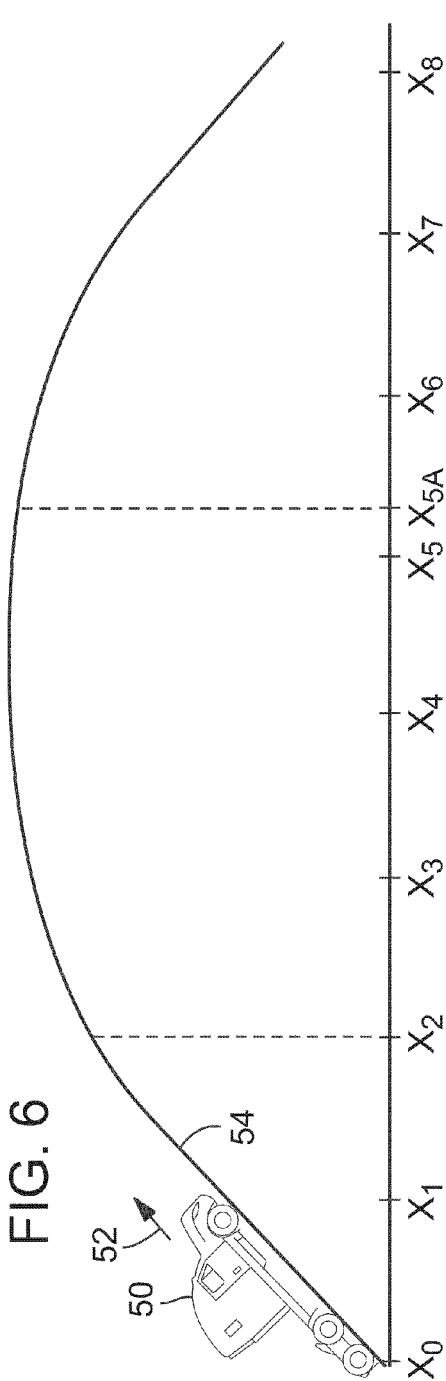
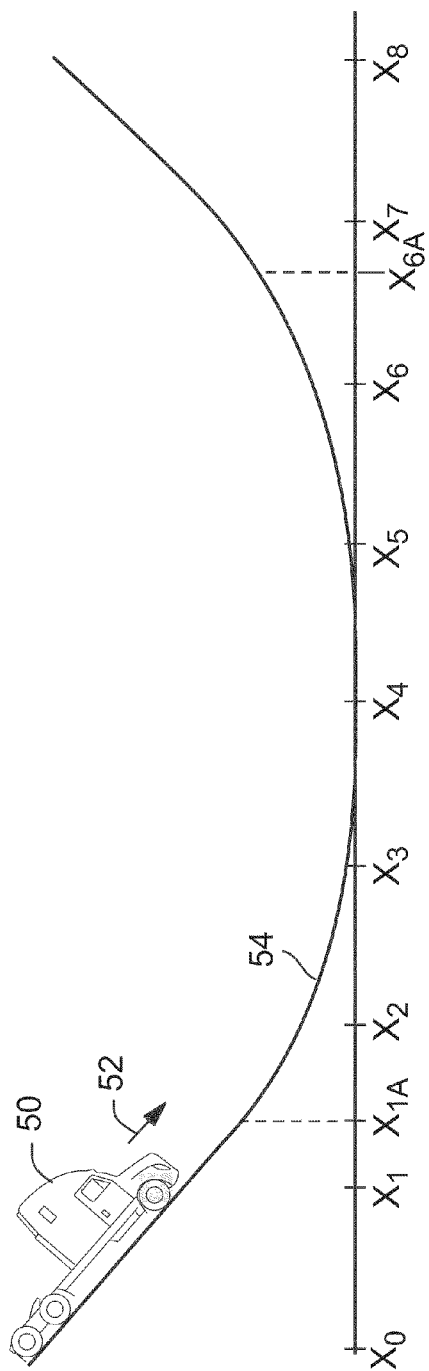

VEHICLE TORQUE MANAGEMENT

TECHNICAL FIELD

The technology disclosed herein relates to managing the engine torque of a vehicle to, for example, enable the more efficient operation of the vehicle.

BACKGROUND

Current vehicles, such as heavy-duty class 8 trucks for traveling along highways and other roadways are understood to be designed to haul the gross vehicle weight rated (GVWR) loads while operating on the steepest realistic grade, which represents the worst-case scenario. Hence, engines for such vehicles are specified with a maximum torque curve suitable to propel the truck or other vehicle in the above-mentioned worst-case scenario. This maximum torque curve is typically programmed into an engine control unit (ECU) and for convenience is sometimes referred to herein as the Max Torque Curve. In conventional trucks, a driver moves a throttle pedal during operation of a vehicle. Electronic throttle pedals commonly being used in today's trucks transform a driver's throttle pedal request (based on the position of the throttle pedal during vehicle operation) to an engine torque request, which is then limited by the Max Torque Curve programmed into the ECU. For example, if the throttle pedal request is for a greater amount of torque than permitted by the Max Torque Curve at the engine speed, the torque is limited to the maximum torque allowed by the Max Torque Curve and not a greater torque corresponding to the throttle pedal request.

A conventional engine controller schematic in accordance with this known approach is depicted in FIG. 1. In FIG. 1, an electronic accelerator pedal control 10 is shown with an accelerator pedal 12. A signal 14 corresponding to the accelerator pedal position is delivered to an engine controller 16 for the vehicle engine. At block 20 of the engine controller, a driver's accelerator pedal percentage request (based on the position of the accelerator pedal 12) is converted to an equivalent percentage torque request. This mapping incorporates any applicable throttle pedal filtering in a conventional manner. The requested percentage torque signal 24 is then used to calculate the requested vehicle torque, which is limited by the Max Torque Curve 26 to not exceed the maximum torque permitted by the Max Torque Curve. A signal indicating the desired torque is shown at 28 in FIG. 1 and corresponds to the desired torque if the requested torque is less than the maximum torque permitted by the Max Torque Curve, or to the maximum torque if the requested torque is greater than the torque permitted by the Max Torque Curve. Based on the requested torque signal 28, and the current engine speed, the engine controller 16 calculates the amount of fuel to be injected into or otherwise delivered to the cylinders of the engine. This calculation can be performed in a conventional manner utilizing a fuel map 30 as shown in FIG. 1.

In essence, as long as the driver's request for acceleration does not exceed the maximum torque permitted by the Max Torque Curve, the request for acceleration is granted irrespective of the load on the engine, which load significantly varies with factors such as the vehicle mass and road grade. For example, a vehicle traveling on a flat road with no cargo is operating at a very low engine load in comparison to a fully loaded vehicle traveling on a steep grade. Consequently, when a vehicle is traveling unloaded on a flat road and a vehicle cruise control, if any is present, is inactive (meaning the cruise control is not being used to control the vehicle even if technically on), the vehicle driver/operator can accelerate on an irregular basis to the maximum limit dictated by the Max Torque Curve, which can result in wasted fuel due to unnecessary or unregulated rates of acceleration of the vehicle limited only by the Max Torque Curve.

It is not unusual for a Class 8 heavy duty truck to operate under cruise control for approximately 50% of the time. Under active cruise control, the driver/operator is not actively controlling the vehicle's speed with the cruise control requesting the necessary engine torque to maintain a steady speed. Under cruise control, the vehicle experiences low rates of acceleration and deceleration. It is not unusual for a truck of this type to be operating under idle conditions for approximately 20% of the time and thus is under minimal torque conditions. It is also not uncommon for approximately 30% of the time for the vehicle to be actively controlled by the driver/operator with the driver/operator constantly operating the accelerator pedal to move the vehicle. Depending upon the expertise of the driver, the vehicle could experience varying rates of acceleration while traversing the same route from point A to point B. A good, fuel-efficient driver tries to maintain low rates of acceleration by requesting less torque from the accelerator pedal thereby saving fuel. An inexperienced driver could be aggressive and accelerate and decelerate the vehicle, leading to a fuel penalty (wasted fuel and low mileage). The unregulated rate of acceleration of the vehicle, other than by the Max Torque Curve, can thereby contribute to fuel penalties.

Therefore, a need exists for improved vehicle torque management whereby a driver's request for acceleration is limited depending upon conditions such as engine loading conditions, environmental conditions and vehicle operating parameters. This can improve the fuel efficiency achieved by drivers, especially aggressive and inexperienced drivers.

SUMMARY

In accordance with aspects of this disclosure, methods and apparatus are disclosed for managing the torque of a vehicle. That is, the maximum torque available to the operator of a vehicle can be limited to a magnitude that is less than maximum torque otherwise available to the vehicle under a Max Torque Curve that is provided for the vehicle engine. Exceptions can be provided to allow the vehicle operator to follow the Max Torque Curve, for example, when the vehicle is being operated to pass another vehicle. For vehicles equipped with a cruise control, typically the torque is not limited when the cruise control is actively controlling the vehicle. That is, desirably the torque limiting methods and apparatus operate to limit the torque under conditions where a vehicle driver operator is manually requesting torque directly or indirectly, such as by movement by the operator of an accelerator pedal. It is to be understood in this disclosure that the description of a method also encompasses apparatus that is operable to perform the method, including desirable components of the apparatus for doing so.

In accordance with an embodiment, one computer implemented method of establishing the maximum allowable engine torque for a vehicle comprises: determining the mass of the vehicle, determining the slope of the upcoming road on which the vehicle is to travel, calculating a maximum allowable engine torque for the engine of the vehicle using longitudinal dynamics equations for the vehicle and based at least in part upon the mass of the vehicle and the slope of the road on which the vehicle is to travel, and selectively limiting the maximum torque of the vehicle engine to the calculated maximum allowable torque under engine operating conditions wherein the engine is not under the control of a vehicle cruise control system.

The mass of a vehicle can be determined in a variety of ways. For example, an onboard mass sensor can be used. Alternatively, a mass estimator can be used. As another approach, a vehicle can be weighed with a signal corresponding to the vehicle weight then being provided as a mass indicating input signal. The mass of the vehicle can then be determined by correlating the mass indicating input signal with a value for the mass (using, for example, a lookup table), or by reading the input signal. As yet another approach, a given vehicle type may have an assigned mass or weight which is then adjusted by the weight of any load placed on the vehicle, determined, for example, by weighing the load and from an input signal provided to indicate the load weight.

In connection with determining the slope of the upcoming road on which a vehicle is to travel, the slope can be determined in any desirable manner. For example, a slope estimator can be used to determine the instantaneous slope of the road with the instantaneous slope at the time of calculation being used in the determination. More desirably, if the slope data is available, a three dimensional map database or other database containing slope information correlated to the route to be traveled by the vehicle can be used with the slope being determined from the database. For example, slope data can be stored as an attribute of road segments with the slope for a particular road segment then being used in the calculations to provide a predictive or future looking torque management approach. Longitudinal dynamics equations for the vehicle can be simplified or more complex depending upon the degree of accuracy desired in the calculations. Both external and internal parameters can be used in these equations. The calculated maximum allowable torque or maximum allowable torque curve for a particular road segment can then be applied to limit the torque of the engine to the calculated maximum amount, or an estimate thereof. For example, the maximum torque can be limited to the calculated maximum torque unless certain exceptions apply.

In accordance with an embodiment, the maximum torque can be limited to the calculated maximum torque when the engine is not under the control of the vehicle cruise control system. By under control it is meant that the engine acceleration is being controlled by the vehicle cruise control system. Another exemplary exception is to allow the maximum torque under the Max Torque Curve, as opposed to the calculated maximum allowable torque, if an override acceleration request is received, such as made by a vehicle operator when greater acceleration is needed to pass another vehicle. As yet another exception, the maximum torque under the Max Torque Curve can be allowed if the vehicle speed or engine speed (RPM) is below a threshold minimum speed. Thus, a calculated maximum allowable torque can be applied selectively, that is when exceptions such as these exceptions are not present. Other exceptions can also be implemented.

In one desirable approach for predictive operation, assuming data is available that provides the slope for upcoming road segments, the slope can repeatedly be determined and the maximum allowable engine torque be calculated for one or more upcoming road segments at a time.

As yet another aspect of an embodiment, respective speed limits for upcoming road segments, if data is known concerning speed limits, can be factored into the calculations of the maximum allowable torque. For example, if a future segment is known to have a speed limit that is reduced, the maximum allowable torque that is calculated can be reduced in comparison to a similar segment with a higher speed limit. Speed limit determinations can be repeatedly performed for one or more upcoming road segments as the vehicle travels, together with repeated determination of the slope of the road segments.

As another aspect of an embodiment, in the event a maximum acceleration request input is received from a user or operator of a vehicle, the maximum allowable torque under the Max Torque Curve can be allowed for an acceleration override time instead of the calculated maximum allowable torque. The duration of the acceleration override time can be optionally changed, such as based upon the driver's history of maximum acceleration requests. For example, the duration of the acceleration override time can be reduced in the event the number of maximum acceleration request inputs in an override evaluation time interval have exceeded a threshold.

In accordance with yet another embodiment, the act of calculating the maximum allowable engine torque can comprise calculating the torque required to maintain the vehicle at the current velocity of the vehicle, calculating the torque available for acceleration of the vehicle, calculating the maximum possible acceleration, computing the percentage reduction in maximum acceleration based upon a prediction using the upcoming road grade, calculating the maximum allowable acceleration (MAA), based on the MAA, calculating the maximum allowable torque (MAT), and determining whether a vehicle operator has requested a torque that is greater than the MAT, and, if no, allow the vehicle operator requested torque and, if yes, selectively limiting the maximum allowable torque to the MAT. If the operator requested torque is greater than the MAT, the maximum allowable torque can be limited to the MAT in the absence of an exception, such as an acceleration override request.

In accordance with yet another embodiment, in addition to calculating the maximum allowable torque, the minimum torque of a vehicle engine can be selectively varied or limited, such as when the vehicle is not under the control of a vehicle cruise control system. In one specific approach, a minimum allowable engine torque of the vehicle engine can be calculated based at least in part upon the mass of the vehicle and the slope of the road on which the vehicle is to travel. Thus, for example, in situations where data concerning the slope of upcoming road segments and/or speed limits is known, the minimum torque can be set at a calculated minimum torque value that is, for example, higher than the minimum torque otherwise specified for the engine. For example, if the vehicle is approaching a steep hill shortly after the vehicle traverses a downhill road section, the minimum torque that is calculated can be higher than otherwise expected on the downhill portion so that torque is maintained in anticipation of the vehicle traveling uphill. This approach can reduce the number of gear shifts, that can result in a reduction in fuel efficiency.

As a further aspect of embodiments, a maximum allowable engine torque for a vehicle can be selected from at least one torque limiting sub-method from a plurality of available torque limiting sub-methods. These available torque limiting sub-methods can comprise at least a plurality of the following sub-methods: A. applying the torque determined from the Max Torque Curve or other default approach; B. determining the instantaneous slope of the road on which the vehicle is to travel; calculating a maximum allowable engine torque for the engine of the vehicle based at least in part upon the mass of the vehicle and the instantaneous slope of the road on which the vehicle is to travel; selectively limiting the maximum torque of the vehicle engine to the calculated maximum allowable engine torque if the engine is not being controlled by a vehicle cruise control system; C. predictively determining the slope of the road for a plurality of upcoming road segments where the vehicle is to travel and in the expected direction of travel by the vehicle; calculating a maximum allowable engine torque for the engine of the vehicle based at least in part upon the mass of the vehicle and the slope of the upcoming road segments on which the vehicle is to travel; selectively limiting the maximum torque of the vehicle engine to the calculated maximum allowable engine torque if the engine is not being controlled by a vehicle cruise control system; and D. predictively determining the slope of the road for a plurality of upcoming road segments where the vehicle is to travel and in the expected direction of travel by the vehicle; calculating a maximum allowable engine torque for the engine of the vehicle based at least in part upon the mass of the vehicle and the slope of the upcoming road segments on which the vehicle is to travel; selectively limiting the maximum torque of the vehicle engine to the calculated maximum allowable engine torque if the engine is not being controlled by a vehicle cruise control system; determining the respective speed limits for a plurality of upcoming road segments where the vehicle is to travel and in the expected direction of travel by the vehicle and wherein the act of calculating a maximum allowable engine torque is based at least in part upon the respective speed limits and slope for the upcoming road segments. If slope information is not available, but speed limit information is available, the calculated maximum allowable engine torque can be based at least in part upon the speed limit information.

In accordance with embodiments, the sub-method A above can be followed if other available sub-methods are not followed, for example, because insufficient information is available to follow the other sub-methods. As another approach, the sub-method A can be followed in the event other available sub-methods are not followed, and wherein the sub-method B is followed if there is sufficient information to follow sub-method B and insufficient information to follow sub-methods C or D; the sub-method C is followed if there is sufficient information follow sub-method C and insufficient information to follow sub-method D; and the sub-method D is followed if there is sufficient information to follow sub-method D.

In accordance with another embodiment, a further sub-method F can be included in the sub-methods from which the selection is made, sub-method F comprising: storing data corresponding to a set of plural different maximum engine torque curves for a plurality of masses of the vehicle, each Max Torque Curve being a torque curve associated with a respective one of the plurality of masses of the vehicle; selecting a maximum engine torque curve corresponding to the mass of the vehicle; and selectively limiting the maximum torque of the vehicle engine to the selected maximum engine torque curve under engine operating conditions wherein the engine is not under the control of a vehicle cruise control system.

In accordance with a still further embodiment, a computer implemented method and apparatus for establishing the maximum allowable engine torque for a vehicle can comprise: storing data corresponding to a set of plural different maximum engine torque curves for a plurality of masses of the vehicle, each maximum torque curve being a torque curve associated with a respective one of the plurality of masses of the vehicle; determining the mass of the vehicle; selecting a maximum engine torque curve in response to the determined mass of the vehicle; and selectively limiting the maximum torque of the vehicle engine to the torque of the selected maximum engine torque curve under engine operating conditions wherein the engine is not under the control of a vehicle cruise control system. The set of plural maximum engine torque curves can comprise a first maximum engine torque curve that is equal to the Max Torque Curve for the vehicle at a maximum gross vehicle weight rated load for the vehicle and at least second and third additional maximum torque curves for the vehicle engine at second and third gross vehicle weights that are less than the maximum gross vehicle weight rated load.

In accordance with these embodiments, the references to torque curves is not limited to curves in a technical sense as the term torque curve includes stored data corresponding to torque curves and can comprise look up tables for data indicating values of torque for given engine speeds. Typically this data, if plotted, would constitute one or more torque curves. Extrapolation and interpolation can be utilized to find data points between or outside of stored data points.

This disclosure also encompasses a processor programmed with computer executable instructions to carry out the calculations of maximum allowable engine torque. These instructions, when carried out, result in an output signal that controls the fueling of an engine to selectively limit the maximum torque of the vehicle engine to the calculated maximum allowable torque under engine operating conditions wherein the calculated maximum allowable torque is to be applied.

These and other aspects of embodiments described herein will become more apparent with reference to the drawings and detailed description below.

BRIEF DESCRIPTION OF THE DRAWINGS

FIGS. 2-7 are schematic illustrations of exemplary terrains upon which a vehicle can travel for use in describing example vehicle torque management approaches for these various road conditions.

DETAILED DESCRIPTION

Overview

Figure 1:
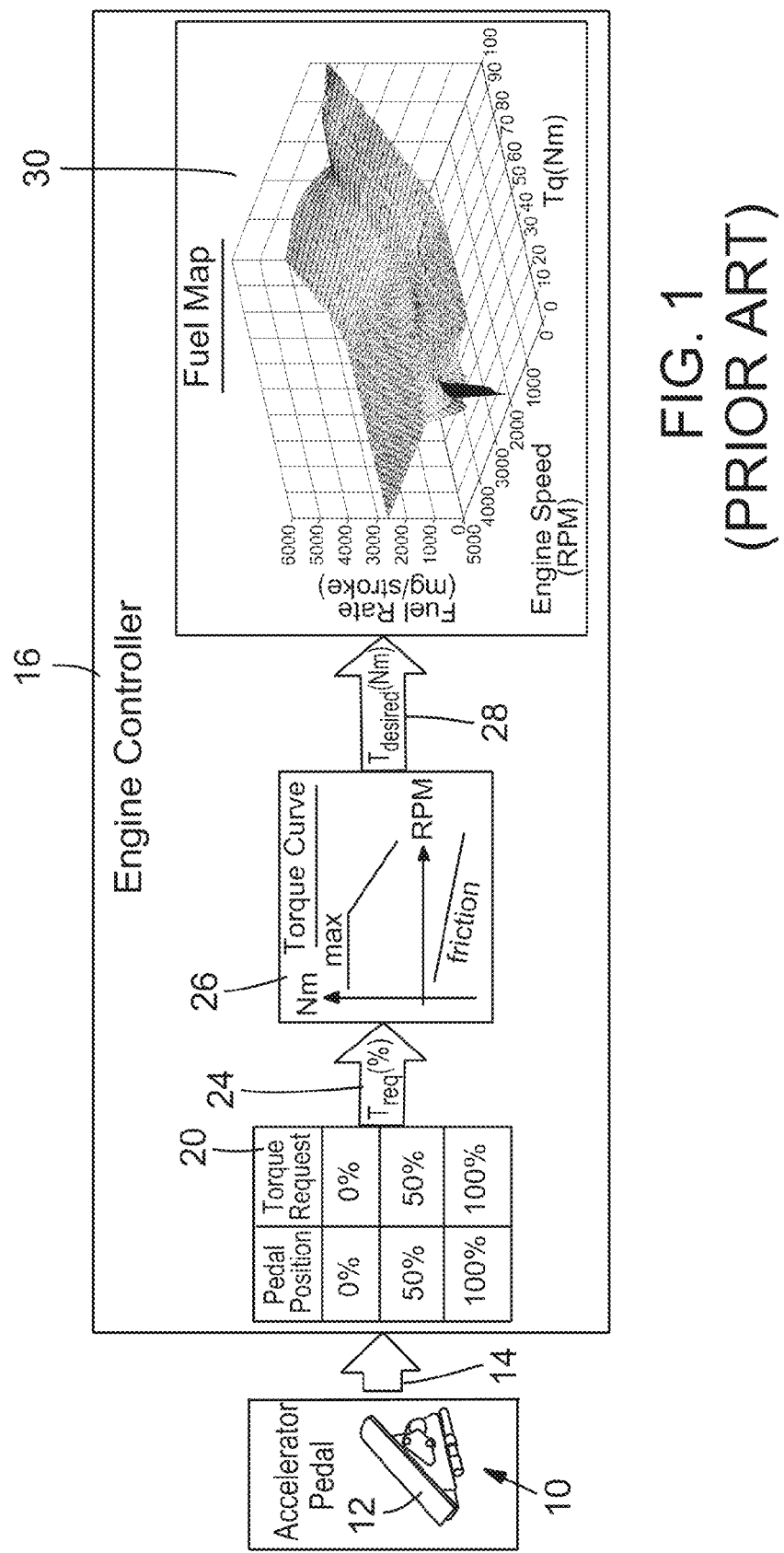
FIG. 1 is a schematic diagram of a known prior art approach for limiting the engine torque from an engine of a vehicle to a maximum engine torque established by a single maximum engine torque curve (Max Torque Curve) for the engine and vehicle at a maximum gross vehicle weight rated load.

To provide an overview of the operation of an exemplary torque management system embodiment in accordance with this disclosure, reference is made to FIGS. 2-7.

In FIG. 2, a truck 50 is shown traveling in a direction 52 along a road 54. For convenience, the truck is shown in exaggerated size relative to the road. A portion of the route upon which the vehicle 50 is to travel is indicated at $X_0$-$X_8$. In this example, $X_0$ refers to the current position of the vehicle. The route, for example, can be entered into a vehicle navigation system by the vehicle operator, or otherwise made available to the system. Although less desirable, the system can simply estimate a route based on the current vehicle position and the direction the vehicle is traveling with the estimate being updated from time to time as the vehicle turns. The route in FIG. 2 is sub-divided into route segments, for example, $X_0$-$X_1$; $X_1$-$X_2$; $X_2$-$X_3$; etc. These segments are shown of equal length in FIG. 2, but can be of differing lengths. For example, when traveling over flat terrain with little or no variation in vehicle operating conditions, these segments can be lengthened. The segments can also be varied depending upon other factors, such as the speed limit for a particular portion of a route. Calculations of the allowable torque can be made for each segment, or over a frame comprising a plurality of segments.

In the FIG. 2 example, attributes can be assigned to the segments, with the points at the end of the segments being deemed nodes and the distance between the segments being deemed a link. One exemplary attribute is the slope of the road between nodes along a link. Another attribute can be the speed limit along the link or segment. Nodes and/or sub-nodes can be established where there are changes in attributes, such as a significant change in road slope, or a change in speed limit. In a specific example, in FIG. 2 a speed limit $S_1$ (such as 60 miles per hour) is indicated from segments $X_0$-$X_3$ and through a portion of the segment $X_3$-$X_4$, namely ending at sub-node $X_{3A}$. A second speed limit, for example, 40 miles per hour, is indicated from sub-node $X_{3A}$ through sub-node $X_{5A}$. At sub-node $X_{5A}$ the speed limit returns again to speed limit $S_1$. By knowing the position of the vehicle, such as from a GPS signal source, and knowing the slope information for the upcoming terrain, a predictive determination of allowable torque can be made. In FIG. 2, this data indicates that there is a long flat section of road ahead, but with two speed changes. Assuming conditions exist for the operation of the torque management system (for example, the cruise control is not controlling the operation of the vehicle, the vehicle is not traveling below a minimum speed, and the vehicle operator has not requested a torque override) the torque management system can determine or calculate an allowable maximum torque, which for a flat road is typically much less than the maximum torque that would otherwise be allowed if the vehicle is operating under the initially specified Max Torque Curve for a vehicle at the gross weight rating for the vehicle.

More specifically, the torque management system can determine an allowable acceleration. From the allowable acceleration longitudinal dynamics equations can be solved for the vehicle to calculate an allowable torque. For example, the allowable torque can be determined by summing the torque required to maintain current vehicle speed by overcoming aerodynamic drag, rolling resistance and engine friction. Other factors can be included in more refined longitudinal dynamics equations, if desired. The torque required to maintain the current vehicle speed is then summed with the torque required to accelerate the vehicle at the allowable acceleration. The engine torque is then limited to the allowable torque determined from these calculations. If there is no acceleration required (e.g., because the road is flat), the allowable maximum torque can be set equal to the torque required to maintain the current vehicle speed. The allowable maximum torque can also be set to a greater level than the torque needed to maintain the current vehicle speed to accommodate factors not taken into account by the calculations. The allowable maximum torque in this scenario can be much less than the maximum torque permitted by the Max Torque Curve for the vehicle at its gross weighted load. As the vehicle approaches $X_{3A}$ (for example at node $X_2$ or node $X_3$), assuming the speed limit data is known for the route, the maximum allowable torque computed in this manner would be reduced prior to the time the vehicle reaches sub-node $X_{3A}$. Alternatively, the allowable torque can be adjusted downwardly at sub-node $X_{3A}$. In addition, prior to sub-node $X_{5A}$, or at sub-node $X_{5A}$ where the speed limit again increases to $S_1$, the calculated allowable torque would increase to allow acceleration from speed limit $S_2$ to speed limit $S_1$. The allowable torque can be adjusted in a desirable manner, such as being gradually increased as opposed to abruptly stepping up at sub-node $X_{5A}$ to the value allowed at a prior node (e.g., node $X_2$) where the speed limit was $S_1$.

FIG. 3 illustrates an example where the vehicle 50 is on a flat portion of the road 54, but a GPS signal (assuming a GPS is being used to determine current vehicle position) and map data identifies an upcoming positive grade starting at sub-node $X_{2A}$. In this example, prior to reaching sub-node $X_{2A}$, the vehicle can be under the same instantaneous conditions as was the case in FIG. 2. In the examples of FIGS. 3-7, the assumption is made that the speed limit has not changed, although if the speed limit changes, calculations of maximum allowable torque such as described above in connection with FIG. 2 can be made to accommodate these speed limit changes. Prior to reaching sub-node $X_{2A}$ in FIG. 3, the torque management system increases the maximum allowable torque (but still often is less than the maximum torque under the Max Torque Curve for the vehicle at the rated gross vehicle weight), and therefore, the allowable acceleration prior to reaching the hill. Thus, the torque management system in this embodiment predictively manages the torque. This allows the vehicle operator to operate the vehicle in a manner that carries more kinetic energy as a hill is approached to thereby assist in climbing the hill.

In FIG. 4, the GPS and map data identifies an upcoming negative grade in road 54 starting at sub-node $X_{2A}$. Prior to reaching sub-node $X_{2A}$, the vehicle can be under the same instantaneous conditions as the flat road scenario of FIG. 2. However, before reaching sub-node $X_{2A}$, the torque management system decreases the maximum allowable torque, and therefore, the maximum allowable acceleration prior to reaching the hill (in this case the downward slope). Hence, the torque management system is operating predictively. During the descent, the vehicle will naturally require less torque and will possibly even accelerate without any torque input. The torque management system thereby restricts the driver from over accelerating before the descent is reached and thereby reduces a need for engine or service braking during the downhill to maintain a safe and legal speed.

In FIG. 5, the vehicle 50 is shown on a long uphill grade with the GPS and map data determining that the grade will continue. Compared to the flat road scenario of FIG. 2, the torque required to maintain the current vehicle velocity will be greater because of the uphill grade. Thus, the maximum allowable torque will typically be increased (as compared to the flat road scenario) by the torque management system to permit the allowable acceleration for the vehicle on an uphill grade. If the grade is steep enough at a given speed, the torque required to maintain current vehicle velocity or speed will exceed the torque the engine can provide, in which case, the allowable torque can be set to the maximum torque of the Max Torque Curve. If the uphill grade is constant, the allowable torque will be increased relative to the torque on a flat road (up to the engine's maximum output torque) but increases in torque beyond increases needed to maintain the current vehicle speed can be restricted. Assume in FIG. 5, instead of a long uphill grade, that the road 54 is sloping along a downhill grade. In this case, the GPS and map data will determine that the grade continues downwardly. The torque management system can determine an allowable acceleration. An allowable maximum torque can be computed by combining the torque required to maintain current vehicle speed by overcoming aerodynamic drag, rolling resistance, and engine friction (and other factors if included in longitudinal dynamics equations) together with the torque required to accelerate the vehicle at any allowable acceleration and the acceleration due to gravity on the downhill slope. The allowable torque may approach zero in cases where gravity overcomes aerodynamic drag, rolling resistance, and engine friction (and any allowance included in the computation) while still accelerating the vehicle at a rate equal to or greater than the allowable acceleration.

In FIG. 6, the vehicle 50 is shown on an uphill slope or grade of road 54 but is approaching the crest of a hill. At node $X_2$ one can see that the grade is lessening. In addition, at sub-node $X_{5A}$ the grade has begun to slope downwardly from the crest of the hill. At node $X_1$, the vehicle can be operating under the same instantaneous conditions as the long uphill grade of FIG. 5. However, because the crest of the hill is being approached, the torque management system desirably decreases the allowable maximum torque and thereby the allowable acceleration as the vehicle gains the crest of the hill to thereby reduce over-acceleration during descent. This reduces the need for engine or service braking during the downhill section to maintain a safe and legal speed.

In FIG. 7, the vehicle 50 is shown on a downhill grade portion of road 54. In addition, the GPS and map data, assuming it is available, determines that the grade will become positive in the near future (e.g., at node $X_5$). At node $X_1$ the vehicle is under the same conditions as a long downhill grade. However, the torque management system can predictively increase the maximum allowable torque, and therefore the allowable acceleration, to allow the vehicle to better convert potential energy to kinetic energy as the vehicle travels downhill. The vehicle can then use that kinetic energy to climb the approaching hill.

Other conditions can be also addressed by the torque management system. For example, if information is delivered to the vehicle about a traffic situation (e.g., a traffic jam at a particular node), the torque management system can predictively decrease the maximum allowable torque in anticipation of the braking otherwise needed as the traffic jam is approached. Torque can also be adjusted based on approaching curves and other road conditions.

In general, given the geographical position of a vehicle along a route (latitude and longitude from, for example, position signals provided to a vehicle mounted global positioning satellite (GPS) receiver), and having a digital map of the route including precise elevation information, and from an estimate of the mass of the vehicle, and with the vehicle being operated under predictive conditions, the torque needed for operation of the vehicle over a next section of the route can be calculated in a predictive manner. The allowable engine torque can be limited to the lesser of the predictive torque or the maximum torque, such as under the Max Torque Curve, for an engine of a vehicle at the rated maximum gross weight. Predictive conditions include, for example, whether a vehicle cruise control is in use (actively controlling vehicle acceleration). If a vehicle cruise control is in use, typically the torque management system is not used to restrict the torque of the vehicle. As another example, predictive conditions can also include whether the vehicle is traveling in excess of a minimum speed and/or whether the engine speed (RPM) is below a minimum. The term "and/or" in this disclosure means "and", "or" and both "and" and "or". Although it can be used under these conditions, the torque management system is desirably not used to limit the allowable maximum torque under the low speed conditions. As yet another example, predictive conditions can include traffic conditions, such as an upcoming construction zone with a speed limit or an upcoming traffic slow down. Current or real traffic conditions along a route can be delivered to the vehicle for use by the system in any suitable manner, such as via satellite or other wireless transmissions.

The operation of the torque management system to control the available torque for the vehicle can be responsive to these predictions to, for example, achieve lower fuel consumption by minimizing rapid accelerations and decelerations by a vehicle operator and/or accelerations or decelerations that prove counterproductive in view of upcoming conditions, such as a hill in the upcoming road. In addition, in a desirable embodiment, the vehicle operator can request and override to eliminate or vary the torque restrictions otherwise imposed by the torque management system, such as when the operator desires to pass another vehicle and more acceleration is required. In the event certain information is not available for a route or route segment (e.g., speed limits and/or elevations) the torque management system can be operated in a mode that is not predictive, such as based on instantaneous vehicle conditions. For example, the instantaneous slope of the current portion of the road being traveled by the vehicle can be used in combination with the determined mass of the vehicle to control the maximum allowable torque. As an alternative mode of operation, a torque management system embodiment can be operated by controlling the torque to follow one of a plurality of torque curves that depend upon the mass of the vehicle. For example, a plurality of torque curves can be provided with one being associated with each of a different vehicle mass and the appropriate torque curve being selected from the plurality of available torque curves and used to control the vehicle torque based on the determined mass of the vehicle. As another mode, if insufficient information is known, a default mode can be used that results in operation of the vehicle with torque being controlled in accordance with the Max Torque Curve for vehicle or some other default approach.

Figure 8:
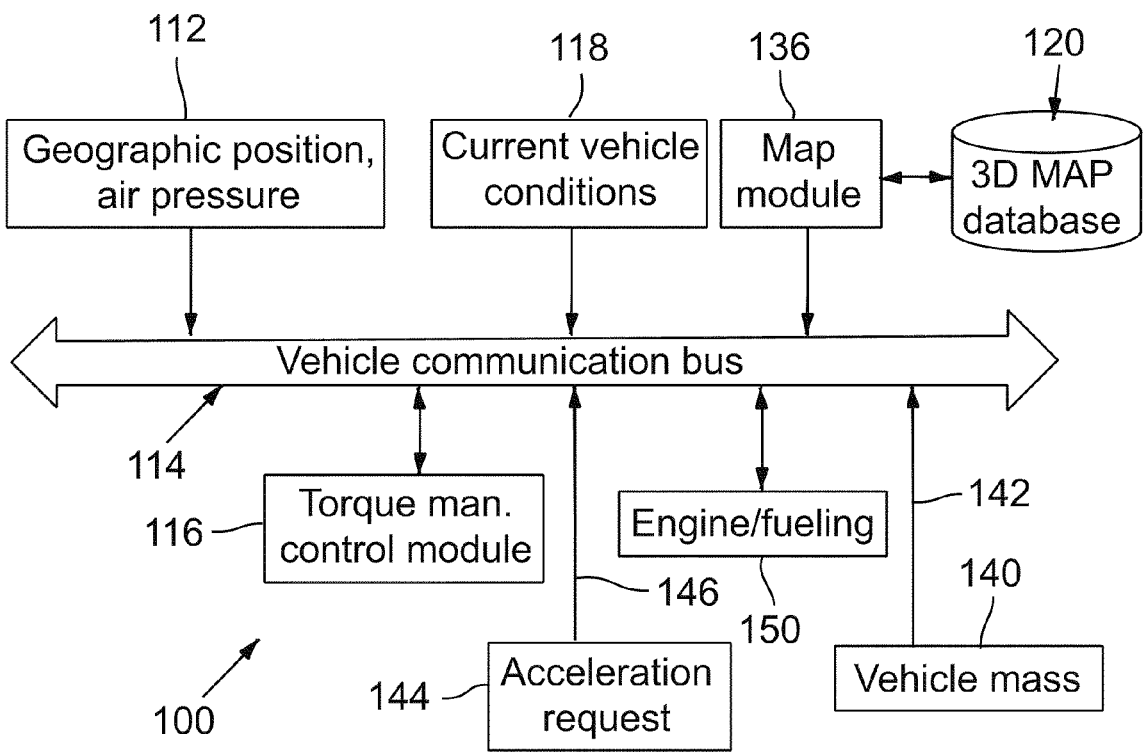
FIG. 8 is a schematic illustration of an exemplary torque management system that can operate predictively to control the vehicle torque based upon upcoming conditions, such as the changing slope in the upcoming road to be traveled by the vehicle.

FIG. 8 illustrates an embodiment 100 of a torque management system in combination with other vehicle components. In FIG. 8, a block 112 is shown that comprises a GPS receiver to provide geographic position information indicating the location of the vehicle. Position signals can be communicated from block 112 to a conventional communications databus 114 and from the bus 114 to a torque management control module 116 that can control the maximum allowable torque available to the engine based on calculations from input information such as explained above.

A three dimensional map database 120 can be provided that can store longitude and latitude information as well as precisely determined elevation information corresponding to the longitude and latitude location. Other information can also be stored in the map database, such as speed limit information for route segments. Thus, assuming the information is available for a given route, or route segment, the 3D database can contain data that includes elevation, speed and other information corresponding to contour changes along the route correlated to the position along the route. Speed limit information can be added and updated in any convenient manner, such as from a speed limit database or by wireless data inputs. The elevation information in the map database can be generated in any convenient manner. For example, a truck or other vehicle with a pressure sensor can be driven over a route with data being sampled (e.g., every 40 milliseconds) to provide accurate elevation information. More frequent samples can be taken, with less distance between data points, when elevation is rapidly changing and less frequent samples can be taken when elevation is relatively unchanged. An exemplary elevation profile can provide accurate elevation information within one percent. A test vehicle can be driven over the route multiple times with the results being averaged or otherwise combined to provide more accurate elevation information for the route. Alternatively, the data can be gathered by one or more trucks traveling over a given route. When a desired number of trips have taken place over the given route, the data may be combined, such as by averaging, to create the route contour. In addition, although GPS supplied elevation information is insufficiently accurate at this time, eventually GPS generated location data and elevation profiles may become accurate enough for use by the system.

With reference to FIG. 8, the exemplary block 112 comprises a GPS receiver that receives GPS signals from which the latitude and longitude of the instantaneous vehicle position can be obtained or computed. In addition, block 112 can also comprise sensors, such as a pressure sensor for determining the ambient air pressure outside the vehicle at the instantaneous vehicle location. Ambient pressure measurements provide an indicator of the density of air and can impact vehicle acceleration. Although not required, the torque required to operate vehicle accessories (such as a fan for the vehicle and the probability of fan operation for a given time over a given route segment) can be estimated and accounted for in the calculations.

These signals can be communicated to the vehicle databus 114. The torque management controller 116 receives these signals from the databus for use in calculating the maximum allowable torque. Signals from sensors or other input devices corresponding to a variety of current vehicle conditions, indicated at block 118, are communicated to the vehicle communication bus and thus are also available to control module 116. A list of exemplary instantaneous vehicle conditions comprises wheel speed, engine rpm, gear clutch status, engine brake level, retarder [additional optional brake] level, and service brake level.

The map module 136 in FIG. 2 can be provided with knowledge of the instantaneous position of the vehicle (from signals on the data bus or from a map request from torque management control module 116) and can fetch data from the 3D MAP database 120 corresponding to an upcoming section of a route or expected route (e.g., the next two to five miles). This upcoming route section can be termed a prediction horizon. If the GPS location or position signal indicates the vehicle has deviated from the expected route section (e.g., taken a freeway exit), a new expected route section can be selected as the next prediction horizon or window. Respective windows can be opened to correspond to successive or otherwise selected route windows such that route information processing can be accomplished simultaneously in more than one such window.

The window or route segments need not be of a constant length, although this can be desirable. For example, when traveling over terrain known to be substantially flat (e.g., portions of Nebraska), the torque management controller can select windows of extended length. Alternatively, instantaneous conditions can be used for torque control. The torque management control module can then predict the anticipated torque and limit the maximum allowable torque as the vehicle traverses this upcoming section of the route. Desirably, the map module 136 retrieves an upcoming prediction window as data related to the just traversed prediction window is discarded so that calculations can be made rapidly on an ongoing basis.

In computing the allowable torque, the torque management control module 116 is responsive to the vehicle mass that can be determined using a vehicle mass estimator 140 with a signal corresponding to the mass 142 being provided, via the bus 114, to the torque management control module 116. A signal corresponding to the mass 142 can be obtained in other ways, such as being inputted as data when the vehicle is weighed. An acceleration request source, such as an acceleration pedal of a vehicle (e.g., accelerator 12 in FIG. 1), provides a signal along a line 146 to the communications bus 114 and hence to the torque management control module. In absence of modification by the torque management control module, provided the acceleration request is within the maximum torque of the vehicle, such as under the vehicle Max Torque Curve, in the absence of a torque management control module the request would otherwise be granted. The torque management control module provides signals via the communications bus 114 to an engine fueling controller 150 which then controls the fueling of the engine to provide the allowed torque.

Figure 9:
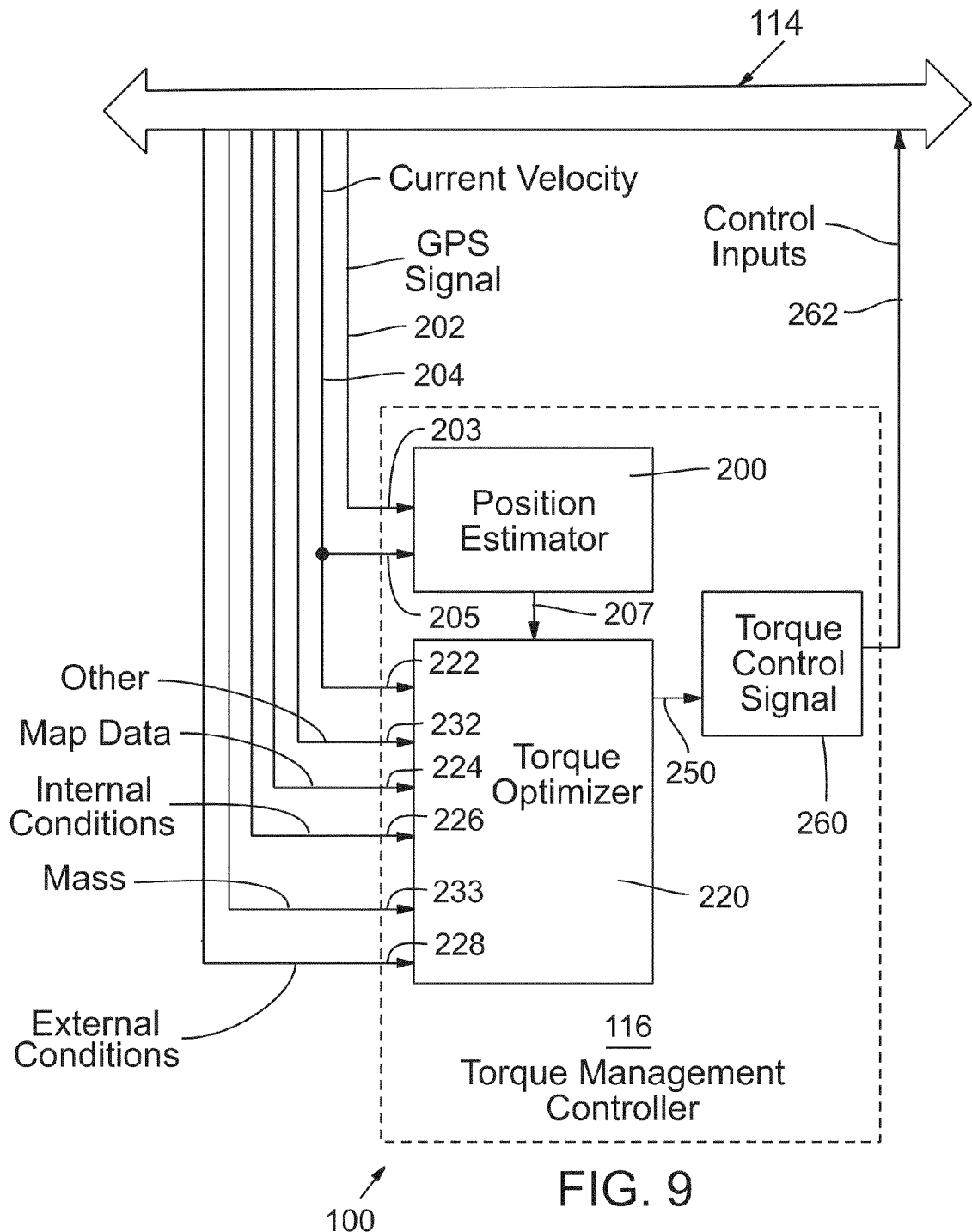
FIG. 9 is a schematic illustration of a torque management controller in accordance with an embodiment.

FIG. 9 illustrates a block diagram of one embodiment of a torque management controller 116 in accordance with the disclosure. The illustrated torque management controller 116 comprises a position estimator 200 operable to compute the position of the vehicle at a given instant in time. Desirably, the vehicle is equipped with a position sensor such as a GPS receiver for receiving a GPS signal indicative of the position of the vehicle, such as by longitude and latitude. The GPS signal, or a representation thereof, is delivered via a line 202 to one input 203 of the position estimator 200. In addition, the current vehicle velocity, or data from which the velocity can be calculated, is delivered via a line 204 to another input 205 of the position estimator. From this data the position estimator can compute the current position of the vehicle and estimate when the vehicle will reach future positions. Output signals corresponding to this position information can be delivered via line 207 to a torque optimizer 220. The torque optimizer 220 can comprise a programmable controller having a processor and associated memory. The controller can be preprogrammed and/or can be provided with an input, such as for receiving original and/or updated programming instructions via the databus 114.

Embodiments of the disclosed methods can be performed by software stored on one or more tangible computer-readable media (e.g., one or more optical media discs, volatile memory components (such as DRAM or SRAM), or nonvolatile memory components (such as hard drives)) and executed on a processor or computer. Such software can be executed on a single computer or on a networked computer (e.g., via the vehicle data bus). The embodiments disclosed herein can be accomplished utilizing computer-executable instructions, such as those included in program modules, which can be executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules. Computer-executable instructions for program modules may be executed within a local or distributed computing environment. For clarity, only certain selected aspects of the software-based implementations are described. Other details that are well known in the art are omitted. For example, it should be understood that the disclosed technology is not limited to any specific computer language, program, or computer.

One or more inputs can be provided to the torque optimizer 220. For example, the current vehicle velocity (or equivalently the current vehicle speed) can be provided at an input 222 and map data can be provided at an input 224. Typically, the map data provides elevation information for upcoming portions of the route and can be searched in segments based upon the estimated position of the vehicle. Vehicle parameter information can be provided at an input 226 to the optimizer 220. For example, an acceleration request signal from an accelerator pedal can be provided. Environmental conditions can also be provided via an input 228, such as the ambient pressure information. The data provided to the optimizer 220 is not limited to these specific data inputs as indicated by an input 232 labeled as "Other" in FIG. 9. For example, traffic information (e.g., an upcoming traffic slowdown, road repair slowdown) can be provided. A signal corresponding to the mass of the vehicle can also be provided at an input 233 to the torque optimizer.

The optimizer 220 can operate in a number of different modes. For example, assuming mass information, map data, including upcoming slope data and position indicating information is available, and the vehicle is being operated under predictive conditions (e.g., exceptions do not exist and a cruise controller is not controlling vehicle acceleration), the optimizer 220 can operate as a predictive torque controller. For example, from the available information, the optimizer 220 can compute a desired maximum allowable torque or maximum allowable torque profile and deliver this profile via an output 250 to a torque control signal accelerator 260 that provides a fueling control signal to a control input 262 of data bus 114 for controlling engine fueling so as to limit the torque to the calculated maximum allowable torque. Other information, such as speed limit information can also be used in the control of the torque. In the event the map data and/or the GPS signal or position information is unavailable, the torque management system can operate based upon instantaneous conditions. For example, the instantaneous slope of the road where the vehicle is at can be used. If the slope information is unavailable, but vehicle mass information is available, the torque can be limited, as explained below, based on the mass of the vehicle. Alternatively, the Max Torque Curve for a vehicle at the maximum gross vehicle weight of the vehicle can be followed, or another default approach used, if sufficient information is unavailable or certain conditions exist (e.g., the cruise control for the vehicle is controlling the engine operation).

Although the position estimator, torque optimizer and torque signal controller are depicted in FIG. 9 as discrete blocks, this is not to be construed as a limitation. That is, the functionality of these components can be combined or distributed.

Figure 10:
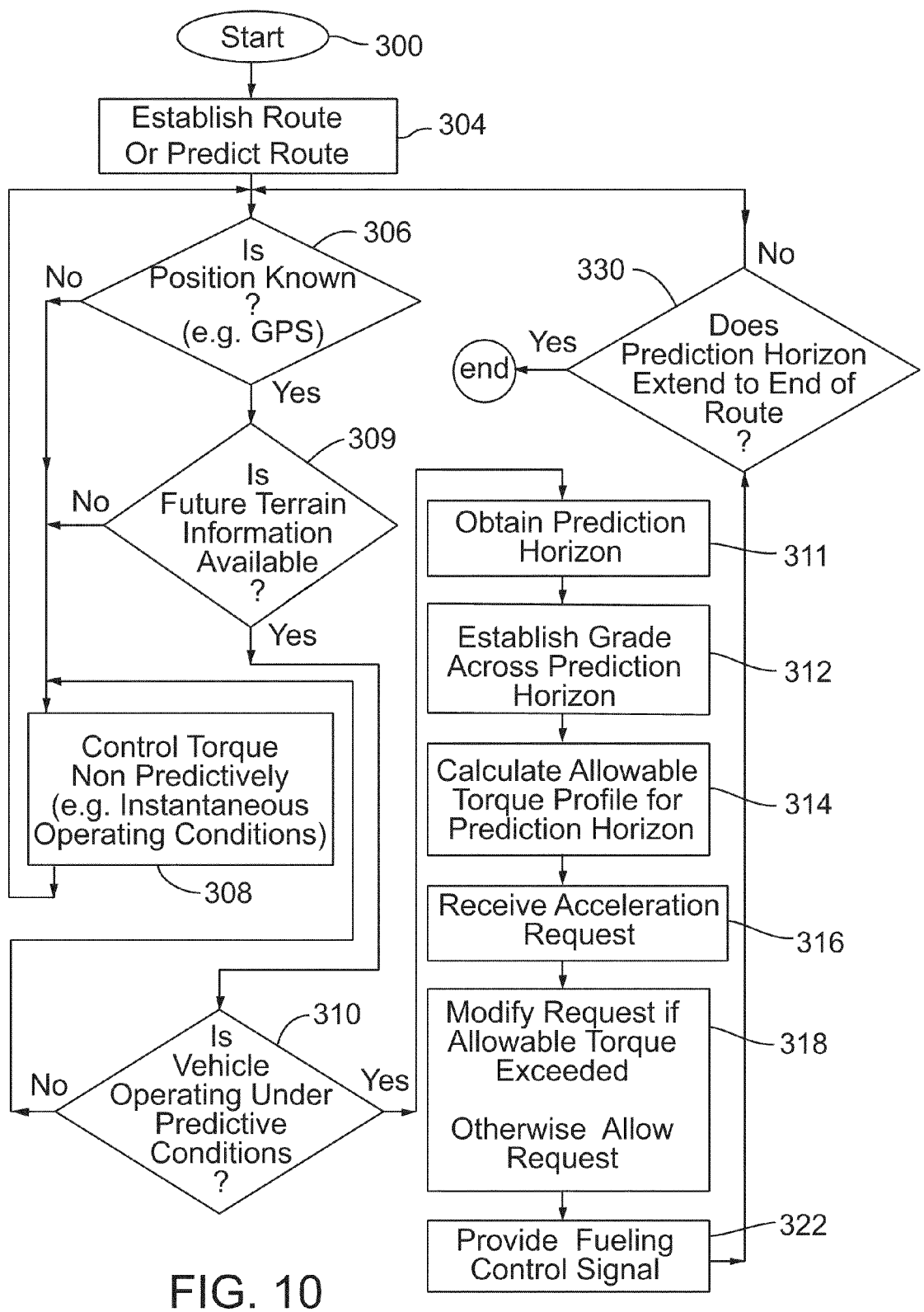
FIG. 10 is a flow chart illustrating one exemplary method of torque management control implemented by the embodiment of FIG. 9.

One exemplary control approach for torque optimizer 220 is illustrated in connection with FIG. 10. The approach starts at block 300 in FIG. 10. From block 300 a block 304 is reached at which the route is established (e.g., by user input) or a segment of a route is predicted. For example, the exact route may not have been established, such as by a driver. In such a case, a predictive route approach can be used with a next segment of a route being predicted from a known position and direction of travel. At block 306 a determination is made as to whether the vehicle position is known (e.g., whether a GPS signal is available). If the answer is no, a block 308 is reached and control of the torque of the vehicle can be based upon mass and instantaneous operating conditions, desirably based both on vehicle parameters and environmental conditions. If insufficient information is available, (e.g., the vehicle mass estimate not known) and, although not shown in FIG. 10, the torque can be controlled using the Max Torque Curve for the vehicle at its maximum rated load, or another default approach can be used.

Assuming at block 306 it is determined that the vehicle position is known, a yes branch from block 306 is followed to a block 309 where a determination is made as to whether the future terrain information is available for the route. If the answer is no, the block 308 is again reached. On the other hand, if at block 309 the answer is yes, a block 310 is reached where a determination is made of whether the vehicle is being operated under predictive conditions. One specific example is to determine whether the vehicle engine is being controlled by a cruise control, and if so, torque control by the torque controller can be blocked. From block 310, a block 311 is reached. At block 311 a prediction horizon (e.g., an upcoming route segment or segments) is obtained and at block 312 the grade information is established across the prediction horizon (based for example upon elevation changes in the map applicable to the prediction horizon). If, for example, the route is known or no roadway exits are present for successive prediction horizons, successive prediction horizons can be obtained and processed at a given time. At block 314, an allowable maximum torque profile is calculated for the prediction horizon using longitudinal diagnostics equations. At block 316, an acceleration request is received, for example, corresponding to a vehicle accelerator position. At block 318, assuming exceptions do not exist (for example, the vehicle is below a minimum speed, which can be predetermined, or the driver is not requesting an acceleration override), the acceleration request is modified if the request would result in a torque that is greater than the calculated maximum allowable torque. If the requested torque is less than the calculated maximum allowable torque, the request is typically allowed. However, in an embodiment wherein the minimum torque is also controlled, if the request would reduce the torque below the minimum calculated torque, the minimum torque is used instead of the request. At block 322 a fueling control signal is provided to control fueling to the engine in a manner that matches the determined allowable torque. The flow chart can be adjusted based on feedback mechanisms to block the control by the torque management system in the event external or internal conditions indicate that such control is no longer desired (e.g., the driver again requests cruise control operation).

From block 322, a block 330 is reached where a determination is made as to whether the prediction horizon extends to the end of the route. If the answer is yes, the vehicle has reached its destination. If the answer is no, the block 306 is again reached and the process continues for the next prediction horizon. It should be noted that, if the route is known or there are no road exits from the road over a plurality of successive prediction windows, plural prediction horizons for a route can be processed at one time to provide control inputs for system components for plural predictive windows as the vehicle travels along the route. Alternatively, the prediction horizons may be processed in series with the next prediction horizon being processed following the processing of the preceding prediction horizon and while control inputs for the preceding prediction horizon are being delivered.

In connection with calculating the allowable torque profile for a prediction horizon in block 314, longitudinal dynamics equations can be used to accomplish such calculations as explained below.

Assuming the mass of the vehicle has been determined, and that predictive conditions exist such that the application of the torque management to control vehicle torque is appropriate, and that upcoming road grade information is available, one approach for determining the maximum allowable torque is based on longitudinal dynamics equations of a vehicle traveling on a roadway. Although this equation can be refined to account for additional factors that impact the longitudinal dynamics of a vehicle (for example, due to the operation of auxiliaries or accessories, such as a vehicle engine fan) one expression for the longitudinal dynamics of a vehicle is as follows:

$$Ma = F_{fueling} - F_{engine\ friction} - F_{engine/service} - F_{Inertial} - F_{Drag} - F_{Roll} - F_{Grade} \quad \text{EQ. 14}$$

The above mentioned forces can be classified into internal and external forces. Internal forces can be described as those specific to the powertrain and external forces described as road load forces. These internal and external forces can be further described as follows.

Internal Forces:

$$F_{fueling} = \eta k T_e \quad \text{EQ. 15}$$

$$F_{engine\ friction} = \eta k T_{fric} \quad \text{EQ. 16}$$

$$F_{engine/service\ brake} = F_{engine\ brake} + F_{service\ brake} \quad \text{EQ. 17}$$

$$F_{Inertial} = \eta J_{eng} k^2 a + \frac{J_{wheels}}{r_{wheels}^2} a \quad \text{EQ. 18}$$

$$k = \frac{engine\ speed}{vehicle\ speed} \approx \frac{n_{drive} n_{transmission}}{r_{wheels}} \quad \text{EQ. 19}$$

External Forces:

$$F_{Drag} = \frac{c_{air} A_L \rho (v + V_{wind})^2}{2} \quad \text{EQ. 20}$$

$$= C_{Drag}(v + V_{wind})^2 \quad \text{EQ. 21}$$

$$F_{Grade} = Mg\sin\theta \quad \text{EQ. 22}$$

$$F_{Roll} = MgC_{rr}\cos\theta \quad \text{EQ. 23}$$

wherein the nomenclature is explained in Table 1 below.

TABLE 1

Parameter Nomenclature

| Parameter | Description |
|---|---|
| $\eta$ | Drivetrain Efficiency |
| $n_{drive}$ | Rear Axle Ratio |
| $n_{transmission}$ | Transmission Gear Ratio |
| $r_{wheels}$ | Dynamic Radius of Wheels |
| $T_e$ | Engine Torque |
| $T_{fric}$ | Engine Friction Torque |
| $T_{enginebrake}$ | Engine Brake Torque |
| $F_{servicebrake}$ | Service Brake Force at the Wheel |
| $J_{eng}$ | Total Engine Inertia |
| $J_{wheels}$ | Total Wheel Inertia |
| a | Vehicle Acceleration |
| $c_{air}$ | Vehicle Drag Coefficient |
| $A_L$ | Vehicle Frontal Area |
| $\rho$ | Air Density |
| v | Vehicle Velocity |
| $V_{wind}$ | Wind Velocity |
| $\theta$ | Road Grade |
| $C_{rr}$ | Rolling Resistant Coefficient |

The above parameters are desirably used in the computation of the allowable torque using the longitudinal dynamics equations. However, most desirably at least the drivetrain efficiency, rear axle ratio, transmission gear ratio, dynamic radius of the wheels, engine torque, rolling resistant coefficient $C_{rr}$, engine brake torque, service brake force at the wheel, vehicle drag coefficient, vehicle frontal area and vehicle velocity are used in the computations. The engine brake torque and service brake force at the wheel can be used simply to indicate whether the brakes are on or off. If the brakes are on, the operation torque management system can be blocked or bypassed. Rear axle and transmission gear ratios are typically hard coded values known for a given engine, vehicle and transmission. Vehicle acceleration can be derived from vehicle velocity. The wind velocity, if not known, can be assumed to be zero. Nominal values can be assigned to air density, if dynamic values are not known. $A_L$ is an approximation of the frontal surface area of the vehicle and is known for given types of vehicles or can be assigned.

In equation 14 above, the quantity $F_{fueling} - F_{engine\ friction}$ refers to the torque being applied as a result of the engine being driven less the engine friction forces. $F_{engine/servicebrake}$ is a deceleration force by any brakes being applied. $F_{inertial}$ the inertial forces that need to be overcome when operating the vehicle. $F_{drag}$ corresponds to the force arising from turbulent friction (e.g., wind drag). $F_{roll}$ is the rolling resistance forces. $F_{grade}$ is the force caused by gravity.

In equation 15, $\eta$ is the effectiveness (powertrain effect efficiency) of the drivetrain for the vehicle, $T_e$ is the torque from fueling the engine, and k is determined in accordance with equation 19. The powertrain efficiency is available from engine specifications for a particular engine. In addition, in equation 16, $T_{fric}$ is the engine friction, which is known for vehicle engines and is a function of factors such as engine speed.

In equation 20, $c_{air}$ is a characteristic shape coefficient for the particular vehicle being operated, $\rho_{air}$ is the density of air, $A_L$ is an approximation of the frontal surface area of the vehicle, and v is the velocity of the vehicle plus or minus the wind velocity of the wind in a longitudinal direction. The air density can be assigned a nominal (initial) value if not calculated and the wind velocity can be assumed to be a nominal value (e.g., zero) to provide an initial $F_{drag}$ approximation.

In equation 22, $F_{grade}$ is caused by gravity where $\theta$ is the angle of the slope. $F_{roll}$, assuming a nominal or initial value of the friction coefficient, can be expressed as $MgC_{rr}\cos\theta$ where M is the vehicle mass, g is the force of gravity, $C_{rr}$ is the rolling friction coefficient, and θ is a grade of the street measured in radians. In one approach, $C_{rr}$ can be assigned the nominal value for dry pavement.

Combining the Internal and External forces results in the following equations:

$$M_{eff}\dot{v} = \eta k T_e - C_{drag}(v + V_{wind})^2 - Mg\sin\theta - MgC_{rr}\cos\theta - F_{engine\,friction} - F_{engine/service\,brake} \quad \text{EQ. 24}$$

$$\text{where } M_{eff} = M + \left(\eta J_{eng}k^2 + \frac{J_{wheels}}{r_{wheels}^2}\right) \quad \text{EQ. 25}$$

Analyzing the full longitudinal dynamics in the absence of Engine Brake and Service Brake operation, reduces equation 24 to the following:

$$\Leftrightarrow (M_{eff})\dot{v} = \underbrace{\eta k(T_{en})}_{f_m} + \underbrace{(-C_{Drag}(v \pm V_{wind})^2 - Mg\sin\theta - MgC_{rr}\cos\theta)}_{F_{ext}} \quad \text{EQ. 26}$$

$$\Leftrightarrow M_{eff}\dot{v} = F_m + F_{ext} \quad \text{EQ. 27}$$

In equation 27 above, $\dot{v}$ is the acceleration.

The engine torque required to maintain the current velocity with zero acceleration can be expressed as follows:

$$T_{en\_v} = -\frac{F_{ext}}{\eta k} \quad \text{EQ. 28}$$

Based on current engine speed, one can calculate the maximum available acceleration, such as by using the following equation:

$$A_{veh\_max} = \frac{\eta k(T_{en\_fullload} - T_{en\_v})}{M_{eff}} \quad \text{EQ. 29}$$

The above equations can be used in calculating the maximum allowable torque in embodiments of a torque management system as explained below.

Figure 11:
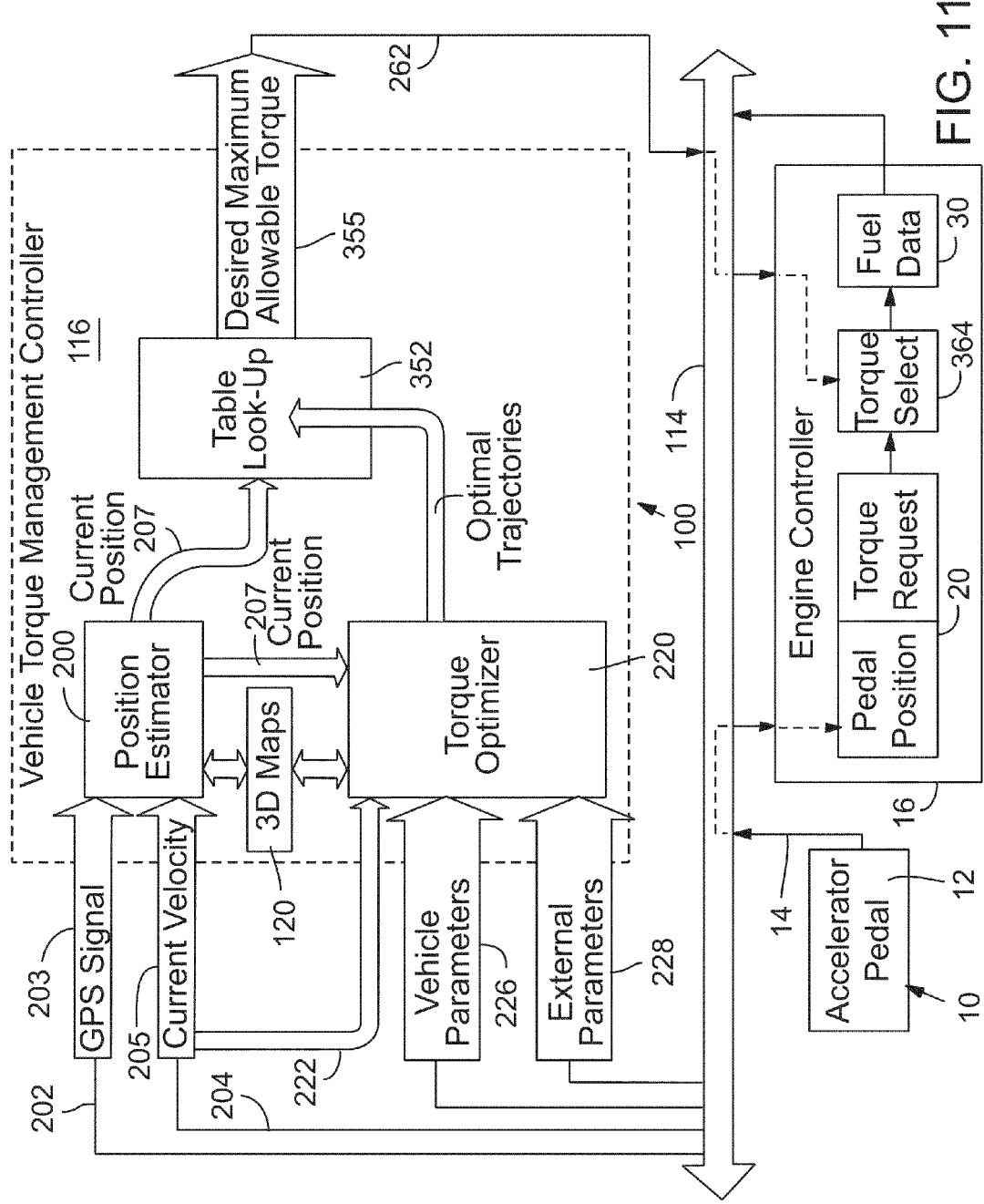
FIG. 11 is a schematic illustration of an alternative form of vehicle torque management controller and torque management system.
Figure 12:
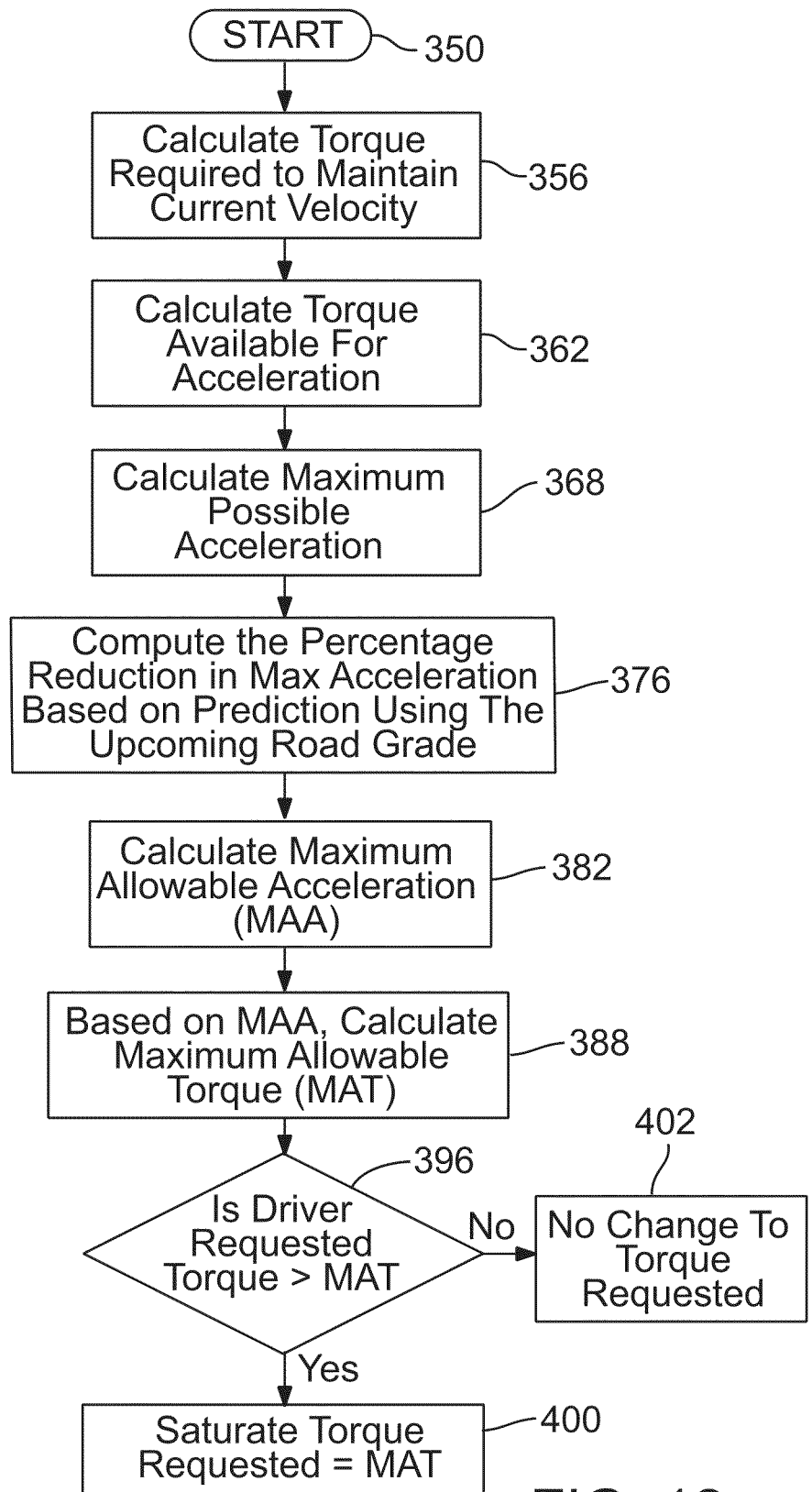
FIG. 12 is an exemplary flow chart that can be used to implement the system of FIG. 11.
Figure 13:
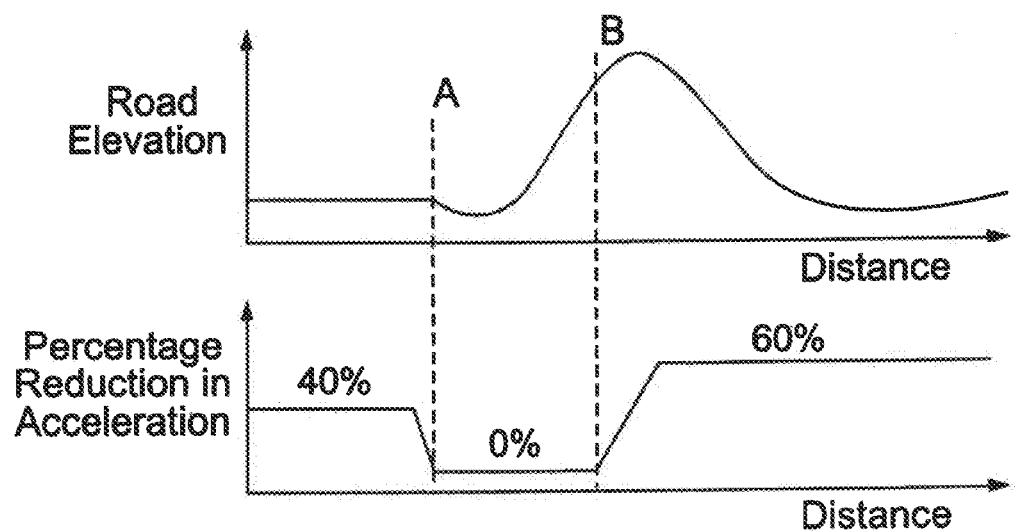
FIG. 13 is a schematic illustration of an exemplary percentage reduction in acceleration, corresponding to a limitation of maximum torque, as road elevation changes.

With reference to FIGS. 11 and 12, another embodiment of a vehicle torque management system is shown. Elements in this embodiment in common with those in FIGS. 1, 8 and 9 have been given the same numbers for convenience. FIG. 11 describes an exemplary system schematic and interface between a vehicle torque management controller and engine controller. The illustrated vehicle torque management controller comprises a position estimator, 3D map database 120, torque optimizer 220 and table look-up 352. Based on a GPS signal 203, current velocity 205 and underlying 3D maps, the position estimator 200 computes the current position of the vehicle on the road. The torque optimizer 220 utilizes vehicle parameters, external parameters, and current velocity to calculate the optimal desired maximum allowable torque for the prediction horizon. Based on the current position on the road, optimizer 220 predicts the maximum torque required to traverse the future road segment utilizing the upcoming road grade information from the 3D Maps. FIG. 13 explains the percentage reduction in acceleration based upon the upcoming grade and current operating conditions. Based on the predicted acceleration reduction, the torque optimizer 220 desirably calculates the desired maximum allowable torque for the entire prediction horizon. The output of controller 116 is then sent to the engine controller 16 via the communication bus 114. The engine controller 16 compares the output from controller 116 and the vehicle operator/driver's torque request to determine the appropriate engine torque.

With reference to FIG. 12, an exemplary process that can be followed by the controller of FIG. 11 starts at a block 350. At block 356, the torque required to maintain the vehicle at its current velocity can be computed using, for example, equation 28. At block 362, the torque available for acceleration is computed based on the maximum engine torque at current engine speed. For example, assuming 1,000 N·m of engine torque is required to maintain the vehicle's speed at block 356. Also assume that 2,000 N·m of engine torque is the maximum amount of torque available under the Max Torque Curve for the vehicle. With these assumptions, the torque available for acceleration would be 1,000 N·m. At block 368, the maximum possible acceleration is computed. This can be done, for example, using equation 29. Thus, in this specific example, if all of the 1,000 N·m of torque available for acceleration were applied to accelerate the vehicle, the maximum possible acceleration would then be determined (for example, 1 M/sec²). At block 376, the percentage reduction in maximum acceleration based on prediction using the upcoming road grade is calculated. This can be obtained from lookup table 352. At block 382, the maximum allowable acceleration (MAA) is calculated. Typically the maximum allowable acceleration (MAA) is less than the maximum possible acceleration of the vehicle at the gross weighted rate of the vehicle. From the acceleration requested by the vehicle operator and the calculated maximum allowable acceleration (MAA), a desired acceleration reduction percentage can be determined as indicated at 355 in FIG. 11. In FIG. 12, based on the maximum allowable acceleration (MAA), a maximum allowable torque (MAT) is determined. This can be converted to a desired maximum torque reduction percentage calculation as indicated by block 358 in FIG. 11. If a driver has requested a torque that is greater than the maximum allowable torque (see block 396 in FIG. 12), at block 400 the requested torque is set equal to the maximum allowable torque (MAT). A signal from controller 116 (see FIG. 11) is delivered via the databus 114 to a torque selection component 364 (FIG. 11) which then reduces the torque request by the desired percentage so that the torque is set equal to the maximum allowable torque. The appropriate amount of fuel is then provided to the engine to provide the maximum allowable torque. If on the other hand at block 396, it is determined that the driver's requested torque is less than or equal to the maximum allowable torque, a block 402 is reached and the driver's torque request is granted.

With reference to FIG. 13, by way of example, consider a road having a first section from the origin shown in FIG. 13 to location A that is flat. Also, assume the vehicle is empty. In this example, the torque management system would calculate the required torque to maintain the current velocity. The predictive control strategy would then calculate the required reduction in acceleration. As an example, if a 40% reduction is commanded, the maximum allowable torque would be computed based on this reduction. Hence, the driver has a lower allowable torque limit and will not be allowed to unnecessarily accelerate the vehicle (in the absence of an exception). In essence, the Max Torque Curve for a vehicle at its maximum gross weight has been shifted downwardly to limit the vehicle acceleration and thereby increase fuel economy.

Assume that a vehicle is fully loaded and the road has a steep grade, such as shown from locations A to B in FIG. 13. In this case, the exemplary controller in one embodiment calculates required torque to maintain the current vehicle velocity. The predictive control strategy can then calculate the required reduction in acceleration. Since the vehicle is fully loaded and the upcoming road is steep, the strategy might command a zero percent reduction. This implies that there are no limitations imposed and the driver has access to the maximum engine torque, such as under the Max Torque Curve. By taking this approach, gear shifts are minimized which create a fuel penalty. In this example, the decision to shift the torque management to the Max Torque Curve for a fully loaded vehicle is based predictively on future road grade and not just on the basis of instantaneous conditions. At location B in FIG. 13, the vehicle is approaching the crest of a hill. A reduction can be set to 60% (for example, to limit the acceleration so that the vehicle reaches a low speed at the top of the hill prior to accelerating going downhill. The transitions in percentage reduction in the acceleration can be gradually implemented. For example, the reduction from 40% to zero percent as the vehicle approaches location A is shown as a sloped or gradual (which can be a multiple step transition) transition in FIG. 13 as opposed to an abrupt single step. Similarly, the percentage increase at location B is shown sloped from zero percent to 60%, as opposed to a single abrupt step transition, although a step transition could be used in either case.

Figure 14:
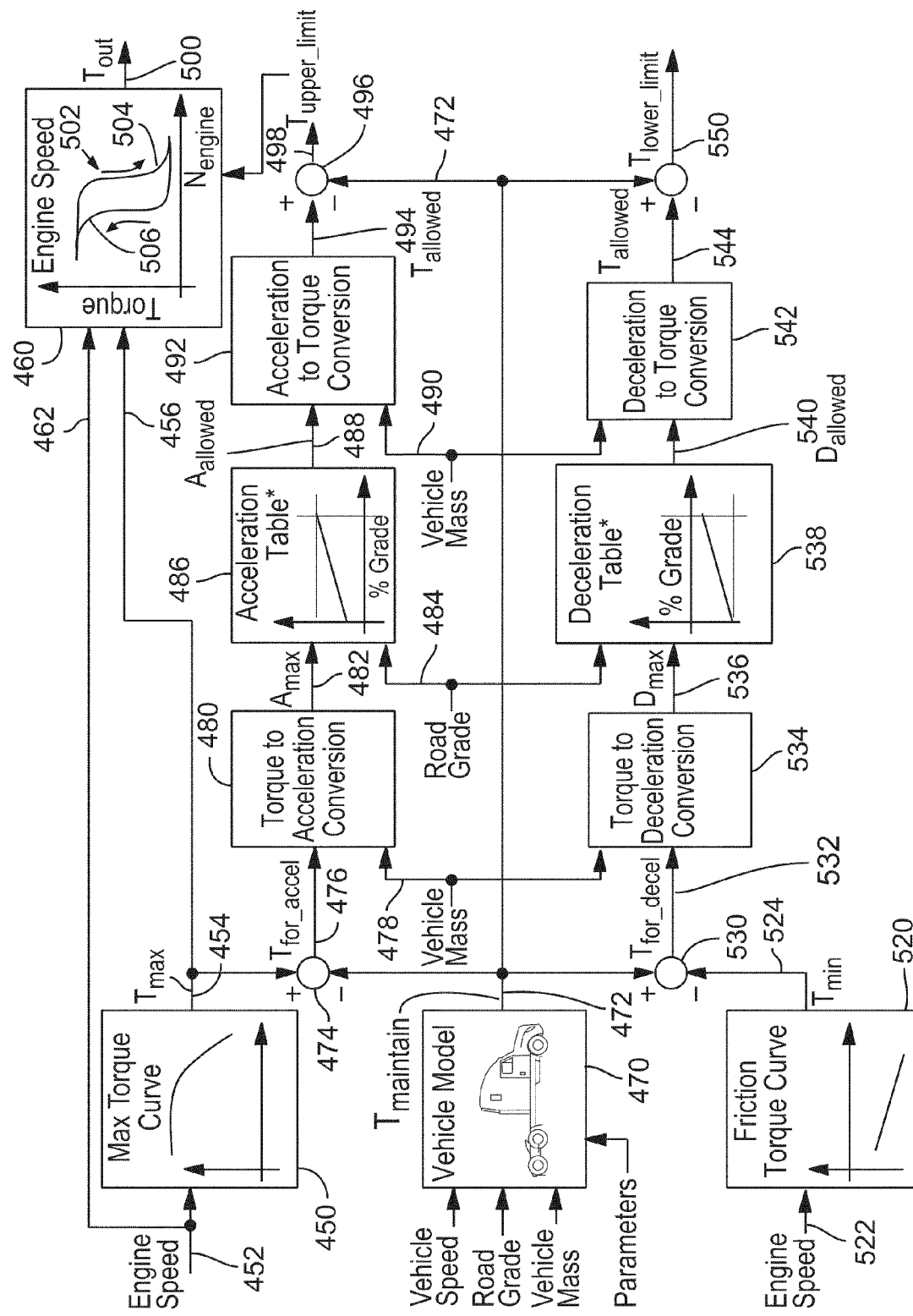
FIG. 14 is a schematic illustration of a torque management system operable to calculate maximum and minimum torques under vehicle acceleration and deceleration conditions.

In accordance with a further embodiment, an example of which is illustrated in FIG. 14, the vehicle torque management system and control strategy can also be used to determine a minimum torque curve to limit unnecessary and unintended deceleration during operation of the vehicle. Limiting unintended deceleration reduces the need to re-accelerate to maintain a desired speed and, thus, increases fuel economy by allowing a vehicle operator/driver to maintain a more constant speed.

In accordance with FIG. 14, the Max Torque Curve for an engine for a vehicle is indicated at 450. From an engine speed input 452, $T_{max}$, the maximum torque that is available is determined. $T_{max}$ is also fed as an input 456 to a torque controller 460.

In addition, the engine speed is also fed as an input 462 to the torque controller 460. From inputs, such as previously described, and using the model for a vehicle 470 which desirably comprises the longitudinal dynamics equations for the vehicle, the torque required to maintain a constant speed can be determined as indicated at an output 472 from the vehicle model 470. This can be determined from equation 28 above and corresponds to block 356 in FIG. 12. At a summing junction 474, the difference between the torque required to maintain the current velocity with zero acceleration and $T_{max}$ is obtained to thereby provide an output 476 corresponding to the torque available for acceleration. This corresponds to block 362 in FIG. 12. From the vehicle mass (or an estimate thereof) provided as an input 478 to a block 480, and from the torque available for acceleration input 476 to block 480, a torque to acceleration conversion can be performed at block 480 resulting in an output 482 corresponding to the maximum possible acceleration. See also equation 29 above and block 368 in FIG. 12. From road grade information (which can be instantaneous or predictively provided for future road segments) at an input 484 and from the value of $A_{max}$ from line 482 at another input, using an acceleration table 486, the maximum allowable acceleration can be determined and provided at an output 488. The calculation of the maximum allowable acceleration corresponds to block 382 in FIG. 12. From the vehicle mass information provided as an input 490 to an acceleration to torque conversion block 492, which also receives as an input the maximum allowable acceleration 488, the block 492 determines the maximum allowable torque ($T_{allowed}$) at an output 494, which corresponds to block 388 in FIG. 12. At a junction 496, the torque allowed for acceleration is added to the torque to maintain the current velocity with zero acceleration to provide a calculated maximum allowable torque, designated $T_{upper\_limit}$ at an output 498 in FIG. 14. The signal on line 498 can then be provided as a torque input signal to block 460 which provides a torque output control signal 500. Block 460 (which corresponds to FIG. 15) is a hysteresis which, in this embodiment, decides the value $T_{out}$ to be used to limit the engine torque. $T_{out}$ can correspond either to $T_{max}$ or $T_{upper\_limit}$ (where $T_{max} \geq T_{upper\_limit}$) depending on the current engine speed, denoted by $n_{engine}$. At lower engine speeds, it is desirable to allow $T_{max}$ to the engine in order to provide the driver with enough torque and discourage downshifting, which would incur a fuel consumption penalty. At higher engine speeds, $T_{upper\_limit}$ would be used to minimize excessive acceleration. The description of FIG. 14 to this point thus substantially corresponds to the embodiment shown in FIG. 11 operating in accordance with the flow chart of FIG. 12.

In addition, in FIG. 14, a minimum torque curve 520 (or other minimum torque limiter) is provided that in one example corresponds to a friction torque curve for the engine. From an engine speed input 522 and the friction torque curve, which is a plot of friction torque versus engine speed, friction torque being a retarding torque, an output 524 is obtained. The output 524 corresponds to the minimum torque, $T_{min}$, which can be set as a lower limit of the torque for a given engine speed when the vehicle is being operated. At a junction 530, the $T_{min}$ torque required to overcome the friction is subtracted from the torque at output 472 required to maintain the current vehicle velocity with zero acceleration to provide an output signal 532 ($T_{for\_decel}$), corresponding to the torque available for deceleration. At block 534, with the $T_{for\_decel}$ input 532 and the vehicle mass input 478, a torque to deceleration conversion can be performed in order to determine an output 536 corresponding to the maximum available deceleration, $D_{max}$ (without using the vehicle service or parking brakes). At block 538, from a deceleration table, which can be instantaneous or predictive if future slope information is available, and from the road grade information input 484, a maximum allowable deceleration, $D_{allowed}$, is determined as indicated by output 540. A deceleration to torque conversion block 542, in response to the input 540 and a vehicle mass input 490, provides an output 544 corresponding to the torque allowed for deceleration which can be subtracted from the torque required to maintain the vehicle at its current velocity speed from input 472 to provide an output 550 that establishes the lower limit $T_{lower\_limit}$ of torque. Desirably the maximum allowable torque is always maintained at or above $T_{lower\_limit}$ to thereby limit unintended deceleration of the vehicle.

Figure 15:
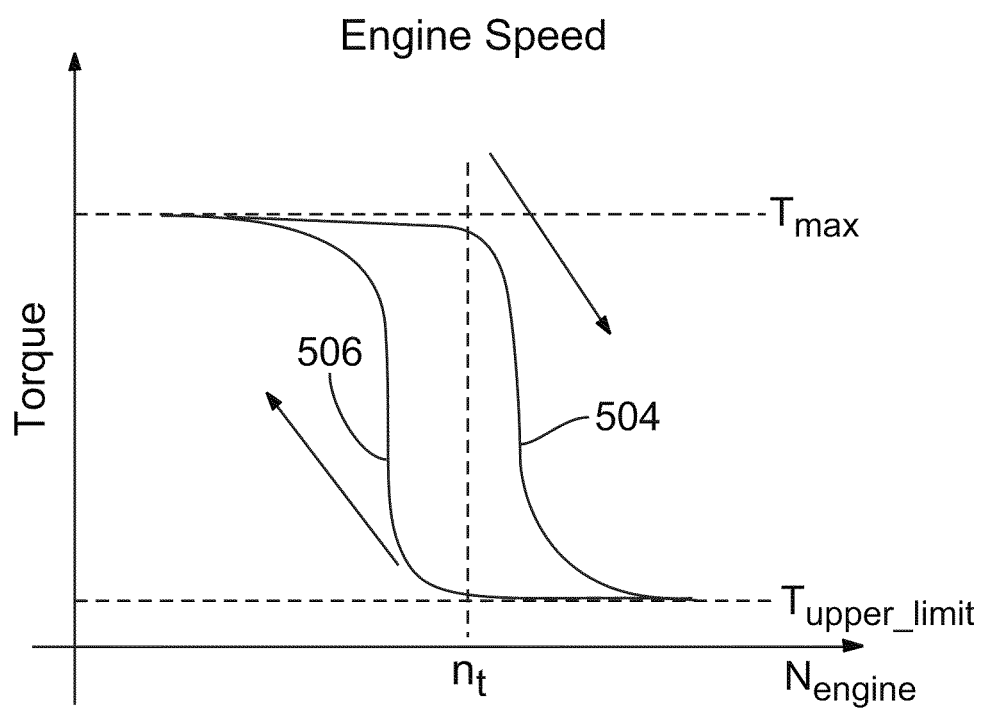
FIG. 15 is an enlarged illustration of a portion of the FIG. 15 implementation.

FIG. 15 illustrates a torque management approach that minimizes or reduces the need to downshift the vehicle. Downshifts put the vehicle engine at a less fuel-efficient operation point. If the vehicle engine speed falls below a threshold engine speed, $n_t$ in the FIG. 16 example, the maximum allowable torque is shifted upwardly. In one desirable approach, the maximum allowable torque is shifted upwardly, for example, along a curve 506, until $T_{max}$ is reached. Once the engine accelerates to a speed that is equal to or greater than $n_t$, the maximum allowable torque will again be reduced, for example, along curve 504, to $T_{upper\_limit}$. The approach of selectively increasing the maximum allowable torque to $T_{max}$ (or to some other value less than $T_{max}$, but above $T_{upper\_limit}$)

assists in minimizing or reducing the number of downshifts that otherwise would take place if $T_{upper\_limit}$ was not adjusted. The hysteresis defined by curves 504, 506 minimizes abrupt transitions as the engine speed drops below and then goes above $\eta_r$.

Figure 16:
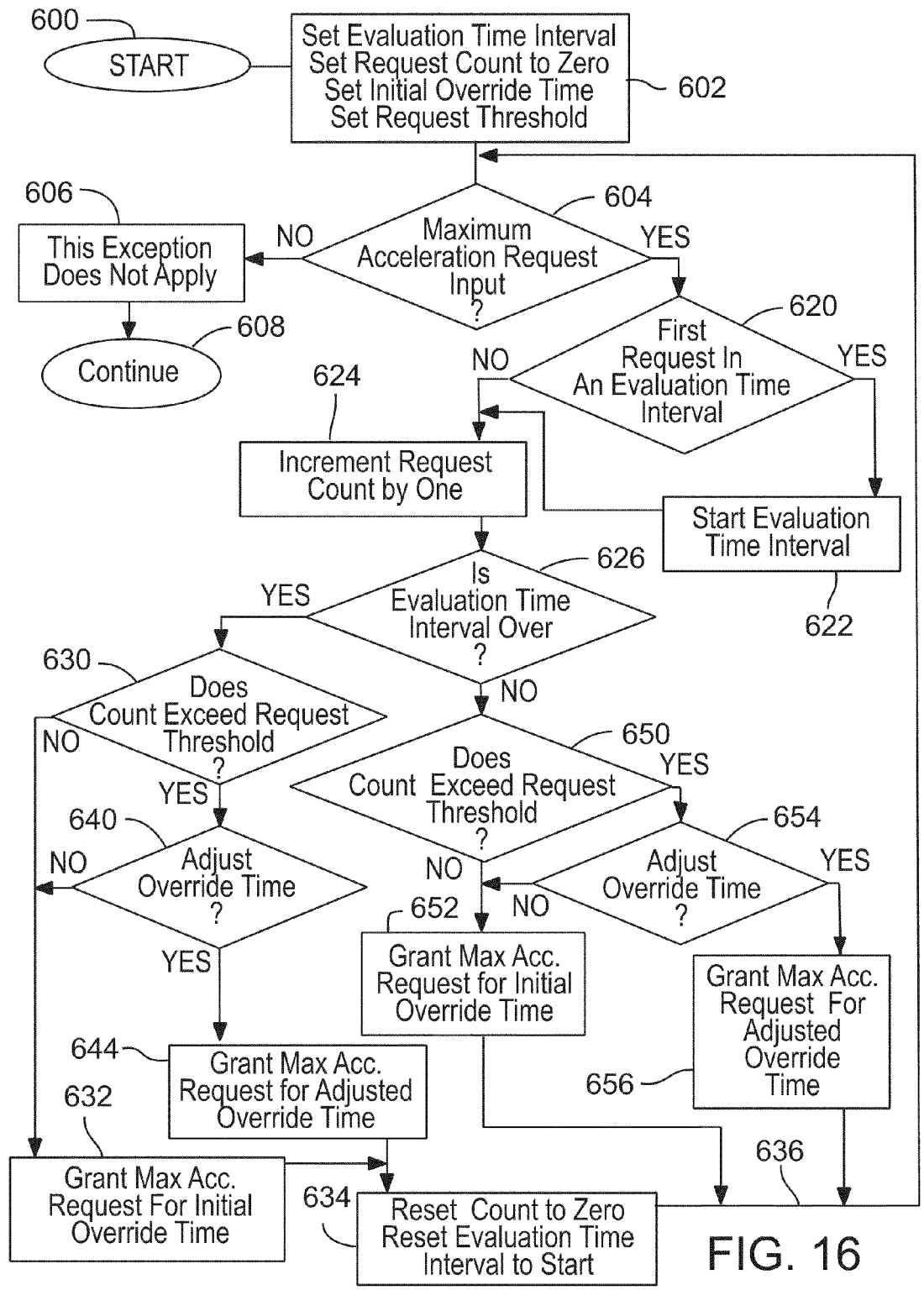
FIG. 16 is a flow chart of an exemplary embodiment of a method for overriding the use of the calculated maximum torque and varying the override.

FIG. 16 illustrates one example of an approach that allows a vehicle operator to request overrides of the vehicle torque management system, for example, if the vehicle operator desires to pass another vehicle. Overrides can be requested, for example, by depressing the accelerator pedal downwardly to its full extent a plurality of times and/or by other alternative override requests mechanisms.

An exemplary override method starts at block 600 in response to an override request. At block 602, assuming an adjustment to the override method based on a history of override requests is desired, an evaluation time interval can be established (for example, 20 minutes). A request count can be set to zero and an initial override time can be established. The override time in one example establishes the duration of the time that the torque management system is disabled or blocked in response to an override or maximum acceleration request input. The request threshold is an option that can be used if the duration of the override time is to be adjusted in the event the driver makes an excessive number of maximum acceleration or override requests.

At block 604, a determination is made as to whether a maximum acceleration request input has been received. If the answer is no, a block 606 is reached indicating that no maximum acceleration request had been received. Therefore, an override request exception does not apply and, at block 608, the operation of the torque management system is continued.

In contrast, if a maximum acceleration request input is received, from block 604 a block 620 is reached. At block 620 the question is asked as to whether the request is the first request in an evaluation time interval. If the answer is yes, a block 622 is reached and the evaluation time interval is started. If the answer is no, the request count is incremented by one at block 624 and a block 626 is reached. At block 626, a determination is made as to whether the evaluation time interval is completed or is over. If the answer is yes, a block 630 is reached and a determination is made as to whether the count exceeds the request threshold. Note, this encompasses whether the count is equal to the request threshold as it would then exceed one less than the request threshold with the one less than the request threshold in effect being a request threshold. If the answer at block 630 is no, a block 632 is reached and the maximum acceleration request is granted for the initial override time period. At block 634 the count is reset to zero and the evaluation time interval is set to start. The process returns to block 604 via line 636.

If in contrast, at block 630, a determination is made that the count exceeds the request threshold, a block 640 is reached. At block 640 a determination is made as to whether the override time is to be adjusted. If the answer is no, block 632 is again reached and the process continues as previously described. If at block 640 the answer is yes, the override time is adjusted and at block 644 the maximum acceleration request is granted for the adjusted override time. Typically in this case the driver operator has made an excessive number of override maximum acceleration requests. To provide an incentive for the driver to reduce the number of such override requests, the adjusted override time is typically shortened when an excessive number of requests have been received. For example, an initial override time may be set for two minutes with an adjustment being to one and one-half minutes in the event of an excessive number of override or maximum acceleration requests during an evaluation time interval.

From block 644, the block 634 is reached and the process continues via block 636 as previously described.

Returning to block 626, if at this block a determination is made that the evaluation time interval is not over, a block 650 is reached. At block 650 a determination is made as to whether the count exceeds the request threshold. If the answer is no, a block 652 is reached and the maximum acceleration request is granted for the initial override time. The process then continues via line 636 as previously described. If at block 650 a determination is made that the count exceeds the request threshold, a block 654 is reached which, like block 640, results in a determination of whether the override time should be adjusted. If the answer is no, the block 652 is reached and the process continues as previously described. If the answer is yes, a block 656 is reached, like block 644, and the maximum acceleration request is granted for an adjusted override time.

The above approach allows for selective overriding of the torque management system under situations where a driver desires the maximum torque permitted from the engine. The above approach optionally allows the adjustment of the duration of time during which the maximum override request is granted based on a history of such requests by the driver/operator. If the history is not taken into account, then the maximum acceleration request can be granted simply upon inputting of the request for an override time with the vehicle operator simply making another override request in the event the override time is not sufficient to accomplish the driver's purpose.

The embodiments of FIGS. 17 and 18 will be described together. Note, although not shown in these figures, communication between the various components is typically accomplished via a vehicle databus, such as bus 114 as shown in FIG. 11. Components in FIGS. 17 and 18 which are like those components of other figures, such as FIG. 11, are given the same numbers and will not be discussed in detail. Also, in FIGS. 17 and 18, a vehicle engine 31 is indicated.

Figure 17:
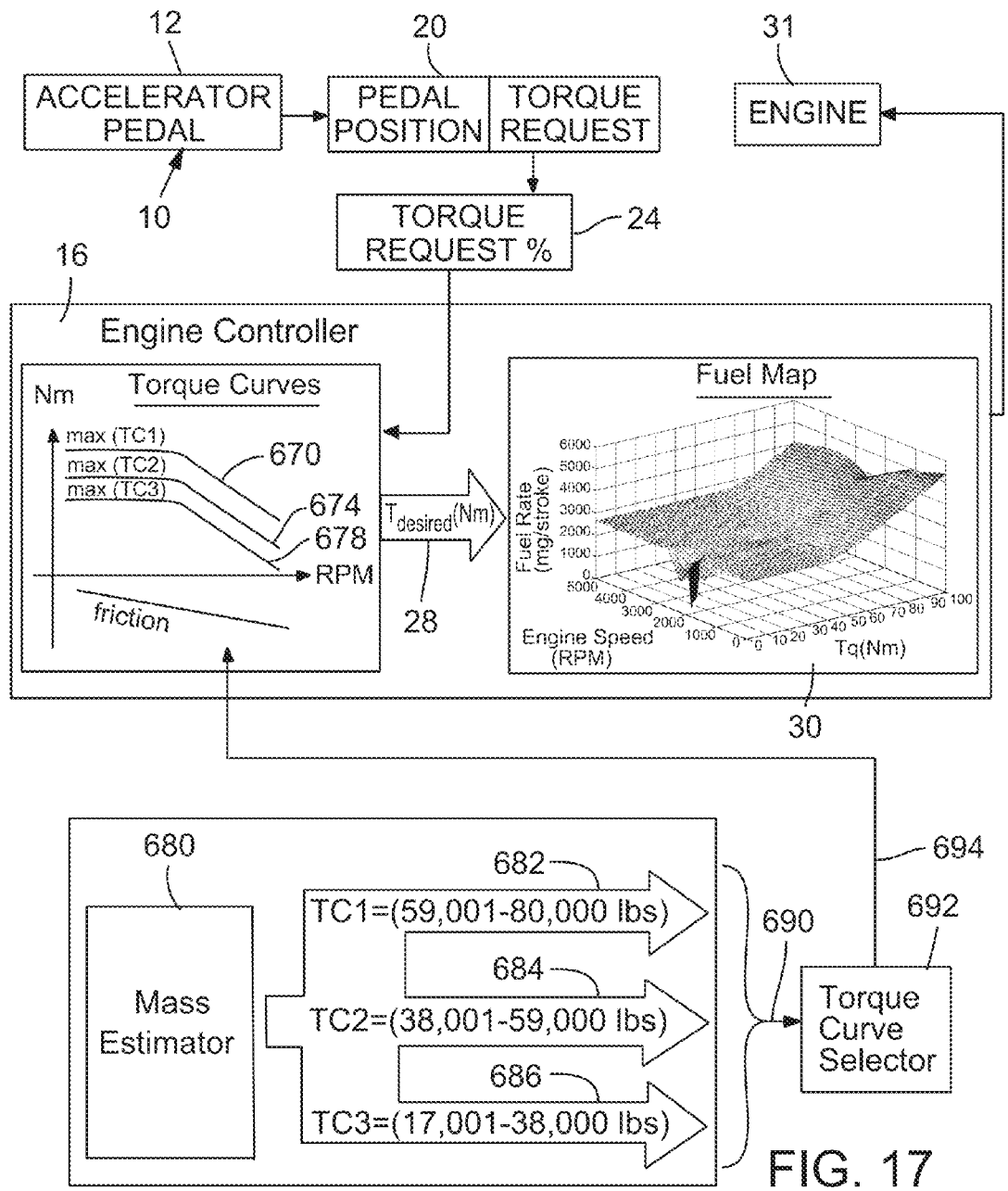
FIG. 17 is a schematic illustration of a torque management system employing a plurality of torque curves in addition to a maximum torque curve for a fully loaded vehicle.
Figure 18:
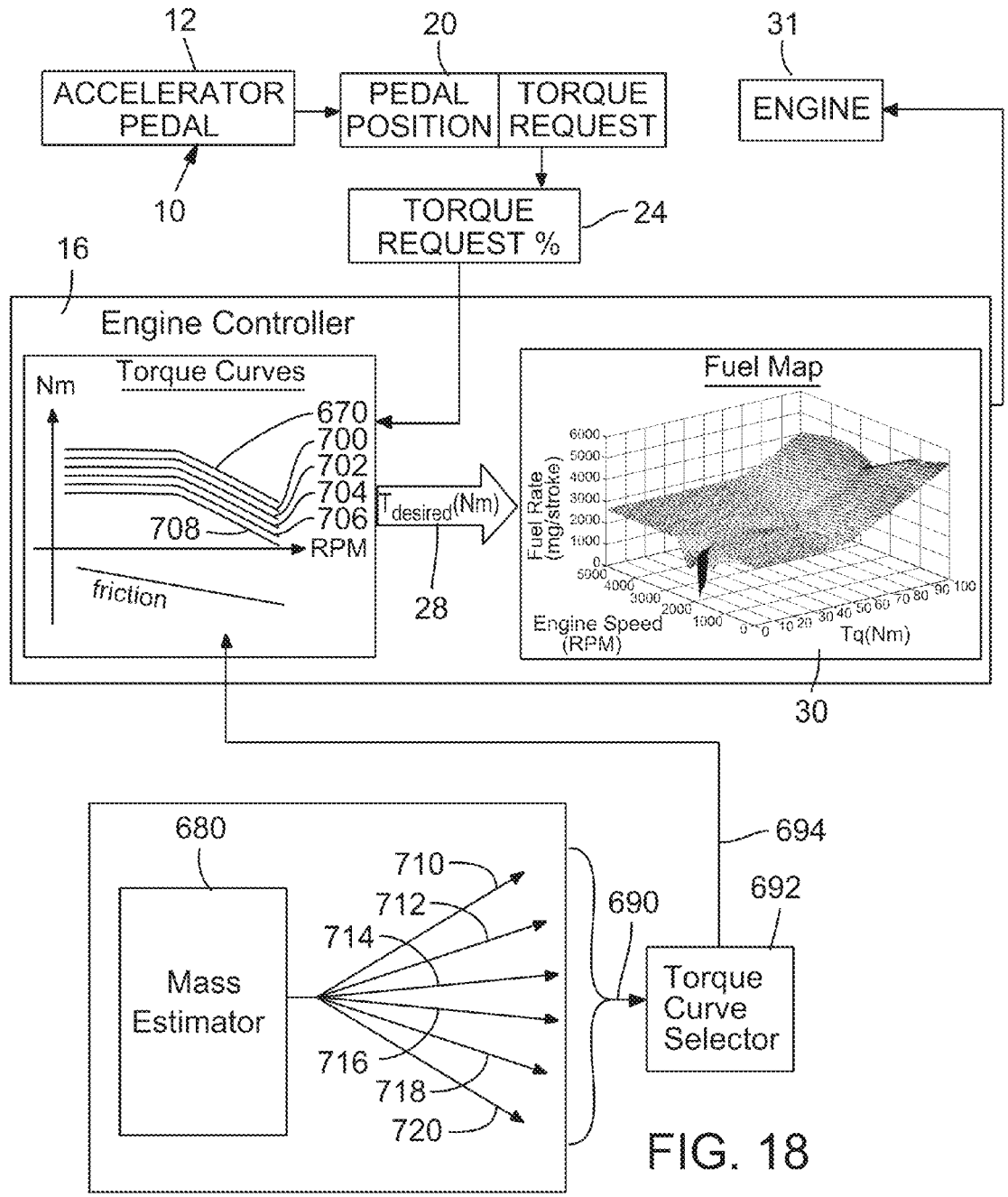
FIG. 18 is similar to FIG. 17 with more torque curves being included in the apparatus than the number of torque curves included in the FIG. 17 embodiment.

In FIG. 17, instead of a single Max Torque Curve for an engine operating a vehicle at its rated maximum weight or load, a plurality of torque curves (again which can be curves in the form of data points or tables) are provided. In FIG. 17, three such curves, 670, 674 and 678 are provided. Curve 670 can correspond, and desirably does correspond, to the Max Torque Curve. Curves 674 and 678 correspond to torque curves for a vehicle having a different mass than the vehicle mass associated with the Max Torque Curve 670. For example, torque curve 678 can correspond to the vehicle when empty or unloaded. Torque curve 674 can correspond to the torque curve for a vehicle that is partially loaded, such as half full. In FIG. 17, the mass of the vehicle is determined such as using a mass estimator 680, or otherwise determined as previously explained.

Assume for purposes of an example, that the gross maximum rated weight of the vehicle is 80,000 pounds, the mass estimator 680 can provide a first output 682 if the vehicle is fully loaded or at some loading approaching full loading. As a specific example, the first output 682 is provided when the weight or mass is from 59,001 pounds to 80,000 pounds. The output 682 can be deemed a full weight mass. In comparison, an output 684 can be provided when the mass is at an intermediate weight, for example a weight somewhere between empty and the full weight, such as from 38,001 to 59,000 pounds. This range of weights can be deemed partially full. In addition, a third output 686 can be provided if the vehicle weight is at a low level such as 17,000 to 38,000 pounds, corresponding to a vehicle that can be deemed empty. These respective outputs can be fed via a line 690 to a torque curve selector 692 that provides instructions via line 694 to an engine controller 16 indicating which torque curve is to be selected. Thus, for example, torque curve 670, the Max Torque Curve in one example, can be selected if output 682 is provided corresponding to a full vehicle. In addition, torque curve 674 can be selected if output 664 is provided corresponding to a partially full vehicle. Furthermore, torque curve 678 can be selected if output 686 is provided corresponding to an empty vehicle. Note, extrapolations and interpolations can be used to find data points between the curves 670, 674 and 678 (and/or below curve 678) based on the determined mass. From the selected torque curve, the desired torque is determined and appropriate fueling is provided, for example, in accordance with data based on fuel map 30, to the engine 31. FIG. 18 is like FIG. 17 except that, in addition to an upper torque curve that can be the Max Torque Curve 670, instead of two other torque curves, five additional torque curves 700-708 are provided, each corresponding to a different mass of vehicle. Torque curve 708 can correspond to a fully empty vehicle in a desirable example. The mass estimator provides outputs 710, 712, 714, 716, 718 and 720, with each output corresponding to a vehicle of a different mass. Each of these outputs also corresponds to one of the torque curves. Thus, the torque curve selector 692 selects from a larger number of torque curves than shown in FIG. 17 depending upon the determined vehicle mass.

Figure 19:
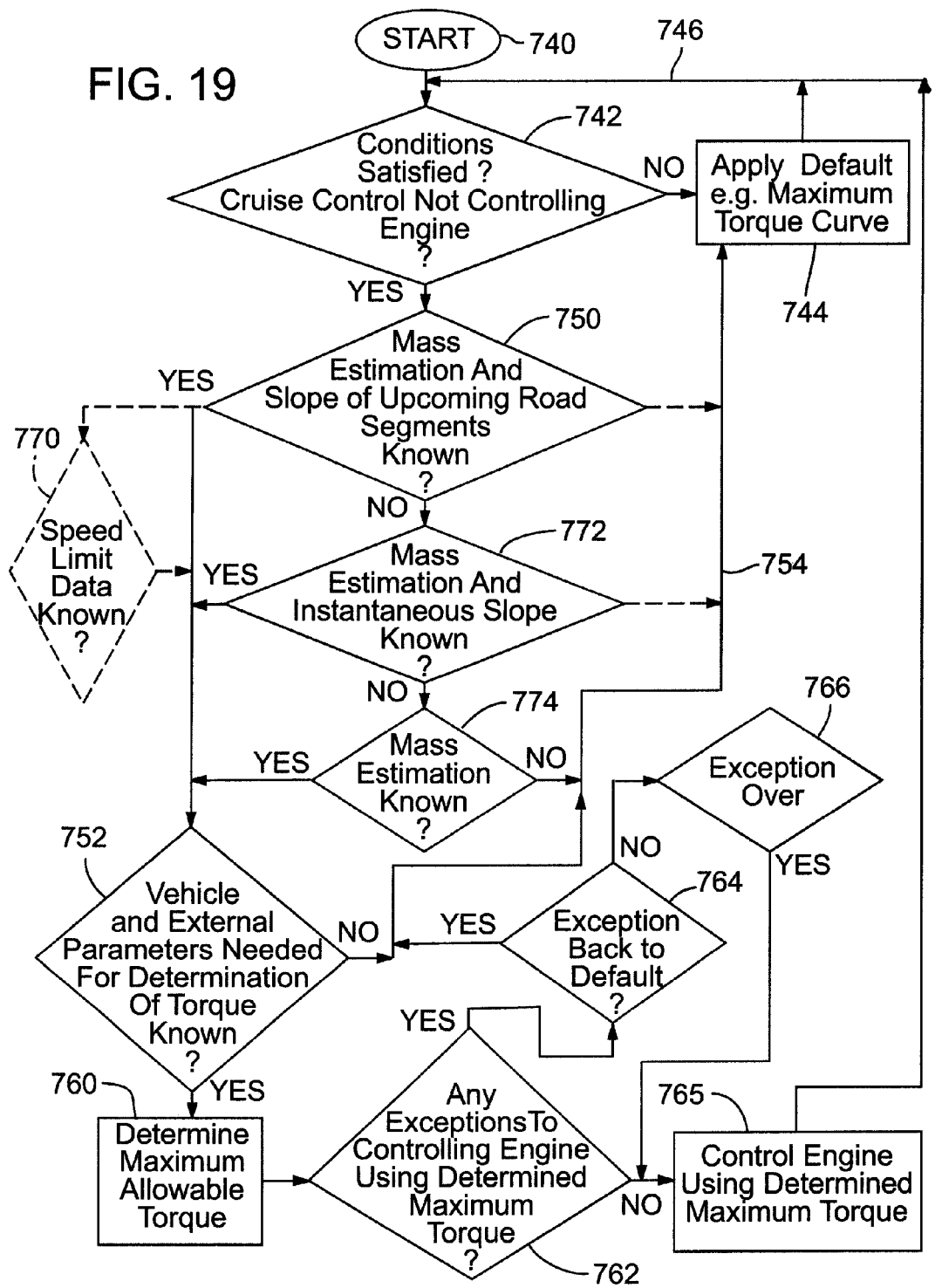
FIG. 19 is an embodiment of a flow chart of a method and apparatus in which torque is managed by selecting and applying a torque management sub-method from a plurality of torque management sub-methods.

FIG. 19 illustrates one approach that can be used to select an appropriate torque management control approach or mode from a plurality of torque management sub-modes. In this example, the default mode can involve applying a default approach, such as the Max Torque Curve, if, for example, insufficient information exists to apply the other sub-modes or exceptions exist that indicate that the torque control system or certain sub-modes thereof should not be used.

Referring to FIG. 19, the process starts at block 740 and proceeds to a block 742. At block 742 a determination is made as to whether exceptions or conditions are satisfied for operation of one or more of the torque control sub-modes. For example, if the vehicle is below a minimum speed, the system may choose not to apply the torque management approaches other than the default mode. As another example, if the cruise control is controlling the acceleration of the engine, torque control sub-methods other than the default sub-method are typically not utilized. Consequently, if the conditions are not satisfied, from block 742, a block 744 is reached and the default approach is applied. In one specific example, the torque is determined using the Max Torque Curve. The process then returns via line 746 to the block 742.

If the answer at block 742 is yes, a block 750 is reached wherein a determination is made as to whether the vehicle mass is known and whether the slope of upcoming road segments are known. If the answer at block 750 is yes, a block 752 is reached and a determination is made as to whether the various parameters needed for determination of the maximum allowable torque are known. If the answer is no, line 754 can be followed back to block 744 and the default approach can be used. Alternatively, the process can go back and follow the no branch from block 750 to block 772 as explained below. From block 752, if the answer is yes, a block 760 is reached and the maximum allowable torque is calculated. A block 762 can then be reached wherein a determination is made as to whether exceptions to controlling the engine using a determined maximum torque exist (for example, is a maximum acceleration override being requested). If there are no exceptions, a block 765 is reached and the engine is controlled using the determined maximum allowable torque. If the answer at block 762 is yes, a block 764 is reached and a determination is made as to whether the default approach should be used. If the answer is yes, line 754 is followed back to block 744 and the default approach is utilized. If the answer is no, a block 766 can be reached at which a determination is made whether the exception is over. If the answer at block 766 is yes, the block 765 is reached and torque control can be based on the maximum allowable torque. From block 766, after a period of time, the process can return to block 754 if the exception has not ended during such time.

Returning to block 750, if the speed limit sub-mode is an available option, from block 750 a block 770 can be reached, at which a determination is made as to whether the speed limit data is known. From the yes branch from block 770, the block 752 can be reached. If the speed limit data is known, a determination at block 752 will determine whether the parameters are available for the determination of the maximum allowable torque. If the speed limit data is not known, the process can simply continue from block 750 as if the speed limit data sub-mode block 770 did not exist.

If at block 750 the mass estimation and slope of upcoming road segments are not known, the no branch from block 750 is followed to a block 772. At block 772 a determination can be made as to whether the mass and instantaneous slope are known. If the answer is yes, the block 752 can be reached and the process continued. If the answer from block 772 is no, a block 774 is reached and a determination is made as to whether the mass information is known. If the answer is yes, the process continues at block 752. If the answer at block 774 is no, the line 754 can be followed back to block 744 and the default approach can be applied.

It should be noted that any one of the approaches of blocks 750, 770, 772 and 774 can be used separately and in various combinations and sub-combinations with one another. A dashed line from block 750 to line 754 corresponds to an example wherein this branch can be followed rather than reaching block 772 if only sub-method 750 is to be used in addition to the default sub-method. In addition, a dashed line from block 772 to line 754 can be followed if block 774 is not being used. Also, any of the blocks 750, 770, 772 and 774 can be eliminated to thereby bypass the sub-method represented by the eliminated block(s). In one desirable prioritized approach, if information is available that permits the use of block 770, the sub-method of block 770 is followed. In addition, if information needed to apply block 770 is not available but the information available to apply block 750 is available, the sub-method of block 750 is applied. Furthermore, if the information is not available to follow block 770 and block 750, but the information is available to follow block 772, then block 772 is followed. Furthermore, if information needed to follow block 770, 750 and 772 is not available, but information needed for following block 774 is available, then block 774 is followed. Again, the default approach is can be followed in the event the other approaches are not available or for reasons otherwise determined.

It should be noted that the various steps or acts shown in FIG. 20 need not be performed in the exemplary order set forth in this figure.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A computer implemented method of establishing the maximum allowable engine torque for a vehicle comprising:

determining the mass of the vehicle;

determining the slope of the upcoming road on which the vehicle is to travel;

calculating a maximum allowable engine torque for the engine of the vehicle using longitudinal dynamics equations for the vehicle and based at least in part upon the mass of the vehicle and the slope of the road on which the vehicle is to travel; and selectively limiting the maximum torque of the vehicle engine to the calculated maximum allowable torque under engine operating conditions wherein the engine is not under the control of a vehicle cruise control system.

2. A method according to claim 1 wherein the act of determining the slope comprises determining the slope of the road where the vehicle is to travel utilizing a 3-dimensional map database.

3. A method according to claim 1 wherein the act of determining the slope comprises predictively determining the slope of the road for a plurality of upcoming road segments where the vehicle is to travel and in the expected direction of travel by the vehicle.

4. A method according to claim 3 comprising the act of repeatedly determining the slope of the road for upcoming road segments as the vehicle is traveling.

5. A method according to claim 3 comprising the act of determining the respective speed limits for a plurality of upcoming road segments where the vehicle is to travel and in the expected direction of travel by the vehicle and wherein the act of calculating a maximum allowable engine torque is based at least in part upon the respective speed limits for the upcoming road segments.

6. A method according to claim 5 comprising the act of repeatedly determining the slope of the road for upcoming road segments and repeatedly determining the speed limits for respective upcoming road segments as the vehicle is traveling and wherein the act of calculating a maximum allowable engine torque is based at least in part upon the determined slope and speed limits for the upcoming road segments.

7. A method according to claim 1 wherein the maximum allowable engine torque is calculated at least in part based upon a plurality of vehicle parameters.

8. A method according to claim 7 wherein the vehicle parameters comprise at least each of the following parameters:

| Parameter | Description |
| --- | --- |
| | Drivetrain Efficiency |
| | Rear Axle Ratio |
| | Transmission Gear Ratio |
| | Dynamic Radius of Wheels |
| | Engine Torque |
| | Crr (Rolling resistance coefficient) |
| | Engine Brake Torque |
| | Service Brake Force at the Wheel |
| | Vehicle Drag Coefficient |
| | Vehicle Frontal Area |
| | Vehicle Velocity. |

9. A method according to claim 7 wherein the vehicle parameters comprise at least each of these additional parameters:

| Parameter | Description |
| --- | --- |
| | Drivetrain Efficiency |
| | Rear Axle Ratio |
| | Transmission Gear Ratio |
| | Dynamic Radius of Wheels |
| | Engine Torque |
| | Engine Friction Torque |
| | Engine Brake Torque |
| | Service Brake Force at the Wheel |
| | Total Engine Inertia |
| | Total Wheel Inertia |
| | Vehicle Acceleration |
| | Vehicle Drag Coefficient |
| | Vehicle Frontal Area |
| | Air Density |
| | Vehicle Velocity |
| | Wind Velocity |
| | Crr (Coefficient of Rolling Resistance). |

10. A method according to claim 1 comprising the act of determining the engine speed and wherein the act of selectively limiting the maximum allowable engine torque is restricted to times when the engine speed is in a non-fuel efficient portion of an engine torque speed map for the engine and when the engine speed is greater than a low engine speed threshold.

11. A method according to claim 1 further comprising not limiting the maximum torque of the vehicle engine and allowing the maximum torque permitted by a maximum allowable torque curve for a vehicle with a gross vehicle weight rated load for an acceleration override time in response to a maximum acceleration request input.

12. A method according to claim 11 comprising changing the duration of the acceleration override time based upon the history of maximum acceleration request inputs.

13. A method according to claim 12 comprising the act of storing the number of maximum acceleration request inputs to create a history of maximum acceleration request inputs in an override evaluation time interval, the method also comprising the act of reducing the duration of the acceleration override time in the event the number of maximum acceleration request inputs in an override evaluation time interval have exceeded a threshold.

14. A method according to claim 11 comprising the act of limiting the torque to the calculated allowable maximum engine torque in the absence of one or more of the following exceptions: a maximum acceleration request input, or the engine speed is below a low speed threshold.

15. A method according to claim 1 wherein the act of calculating the maximum allowable engine torque comprises:

calculating the torque required to maintain the vehicle at the current velocity of the vehicle;

calculating the torque available for acceleration of the vehicle;

calculating the maximum possible acceleration;

computing the percentage reduction in maximum acceleration based upon a prediction using the upcoming road grade;

calculating the maximum allowable acceleration (MAA);

based on the MAA, calculating the maximum allowable torque (MAT);

determining whether a vehicle operator has requested a torque that is greater than the MAT and if no, allow the vehicle operator requested torque and if yes, selectively limit the maximum allowable torque to the MAT.

16. A method according to claim 15 wherein if the operator requested torque is greater than the MAT, limiting the maximum allowable torque to the MAT in the absence of an acceleration override request.

17. A method according to claim 1 comprising the act of selectively limiting the minimum torque of the vehicle engine under engine operating conditions wherein the engine is not under the control of a vehicle cruise control system.

18. A method according to claim 17 comprising the act of calculating a minimum allowable engine torque of the engine of the vehicle based at least in part upon the mass of the vehicle and the slope of the road on which the vehicle is to travel, and comprising the act of selectively limiting the minimum torque of the vehicle engine to the minimum allowable engine torque under engine operating conditions wherein the engine is not under the control of a vehicle cruise control system.

19. A method of establishing the maximum allowable engine torque for a vehicle comprising selecting from and applying at least one torque limiting sub-method from a plurality of available torque limiting sub-methods, the available torque limiting sub-methods comprising at least all of the sub-methods A, B, and C below:
   A. establishing the maximum allowable engine torque to be equal to the torque under a Max Torque Curve for the vehicle at the maximum gross vehicle weight rated load for the vehicle;
   B. determining the instantaneous slope of the road on which the vehicle is to travel; calculating a maximum allowable engine torque for the engine of the vehicle based at least in part upon the mass of the vehicle and the instantaneous slope of the road on which the vehicle is to travel; selectively limiting the maximum torque of the vehicle engine to the calculated maximum allowable engine torque if the engine is not being controlled by a vehicle cruise control system; and
   C. predictively determining the slope of the road for a plurality of upcoming road segments where the vehicle is to travel and in the expected direction of travel by the vehicle; calculating a maximum allowable engine torque for the engine of the vehicle based at least in part upon the mass of the vehicle and the slope of the upcoming road segments on which the vehicle is to travel; selectively limiting the maximum torque of the vehicle engine to the calculated maximum allowable engine torque if the engine is not being controlled by a vehicle cruise control system.

20. A method according to claim 19 wherein the available torque limiting sub-methods also comprise sub-method D in addition to all of the sub-methods A, B and C below:
   D. predictively determining the slope of the road for a plurality of upcoming road segments where the vehicle is to travel and in the expected direction of travel by the vehicle; calculating a maximum allowable engine torque for the engine of the vehicle based at least in part upon the mass of the vehicle and the slope of the upcoming road segments on which the vehicle is to travel; selectively limiting the maximum torque of the vehicle engine to the calculated maximum allowable engine torque if the engine is not being controlled by a vehicle cruise control system; determining the respective speed limits for a plurality of upcoming road segments where the vehicle is to travel and in the expected direction of travel by the vehicle and wherein the act of calculating a maximum allowable engine torque is based at least in part upon the respective speed limits for the upcoming road segments.

21. A method according to claim 19 wherein the sub-method A is followed in the event other available sub-methods are not followed.

22. A method according to claim 20 wherein the sub-method A is followed in the event other available sub-methods are not followed, and wherein the sub-method B is followed if there is sufficient information to follow sub-method B and insufficient information to follow sub-methods C or D; the sub-method C is followed if there is sufficient information follow sub-method C and insufficient information to follow sub-method D; and the sub-method D is followed if there is sufficient information to follow sub-method D.

23. A method according to claim 20 wherein the available torque limiting sub-methods further comprise sub-method E as set forth below:
   E. storing data corresponding to a set of plural different maximum engine torque curves for a plurality of masses of the vehicle, each maximum torque curve being a torque curve associated with a respective one of the plurality of masses of the vehicle; selecting a maximum engine torque curve corresponding to the mass of the vehicle; and selectively limiting the maximum torque of the vehicle engine to the selected maximum engine torque for the curve under engine operating conditions wherein the engine is not under the control of a vehicle cruise control system.

24. A computer implemented method of establishing the maximum allowable engine torque for a vehicle comprising:
   storing data corresponding to a set of plural different maximum engine torque curves for a plurality of masses of the vehicle, each maximum torque curve being a torque curve associated with a respective one of the plurality of masses of the vehicle;
   determining the mass of the vehicle;
   selecting a maximum engine torque curve in response to the determined mass of the vehicle; and
   selectively limiting the maximum torque of the vehicle engine to the selected maximum engine torque curve under engine operating conditions only when the engine is not under the control of a vehicle cruise control system.

25. A method according to claim 24 wherein the set of plural maximum engine torque curves comprise a first maximum engine torque curve that is equal to a maximum torque curve for the vehicle at a gross vehicle weight rated load for the vehicle and at least second and third additional maximum torque curves for the vehicle engine at second and third gross vehicle weights that are less than the first maximum engine torque curve.

26. A method according to claim 25 wherein the third maximum torque curve is a maximum torque curve for an unloaded vehicle and the second maximum torque curve is a maximum torque curve for a partially loaded vehicle.

27. A method according to claim 24 wherein the set of plural different maximum torque curves comprises a first maximum torque curve that is equal to a maximum torque curve for the vehicle at a gross vehicle weighted load for the vehicle and at least one other maximum torque curve for a vehicle having a determined mass corresponding to the vehicle being at a mass that is other than the gross vehicle weighted load for the vehicle, and wherein the act of selecting a maximum engine torque curve comprises selecting a maximum torque curve for the determined mass of the vehicle by interpolating or extrapolating between said maximum torque curves for which corresponding data has been stored in the event the determined mass of the vehicle is not indicative of the mass of the vehicle for one of the maximum torque curves for which corresponding data has been stored.

28. A method according to claim 24 comprising determining the slope of the upcoming road on which the vehicle is to travel and selectively adjusting the selected maximum engine torque curve based on the slope of the road and the determined mass of the vehicle.

29. A method according to claim 28 comprising selectively adjusting the selected engine torque curve upwardly to increase the maximum torque values of the selected maximum torque curve if the slope is increasing and the selected engine torque curve is not adjusted to be above the maximum engine torque curve for the gross vehicle weight rated load of the vehicle and downwardly to decrease the torque values of the selected torque curve if the slope is decreasing.

30. A method according to claim 24 further comprising allowing the maximum torque permitted by the maximum allowable torque curve for a vehicle with a gross vehicle weight rated load for an acceleration override time in response to a maximum acceleration request input, wherein the maximum acceleration request input is determined by the position of a driver controlled kickdown switch.

31. A method according to claim 30 comprising changing the duration of the acceleration override time based upon the history of maximum acceleration request inputs.

32. A method according to claim 31 comprising the act of storing the number of maximum acceleration request inputs to create a history of maximum acceleration request inputs in an override evaluation time interval, the method also comprising the act of reducing the duration of the acceleration override time in the event the number of maximum acceleration request inputs in an override evaluation time interval have exceeded a threshold.

33. A method according to claim 30 comprising the act of limiting the torque to the torque of the selected maximum engine torque curve occurs in the absence of one or more of the following exceptions: a maximum acceleration request input, or the engine speed is below a low speed threshold.

34. An apparatus for establishing the maximum allowable engine torque for a vehicle comprising:
a processor programmed with computer executable instructions and responsive to a first signal corresponding to the mass of the vehicle, a second signal corresponding to the slope of the upcoming road on which the vehicle is to travel, to external parameter signals corresponding to parameters external to the vehicle and to internal parameter signals corresponding to parameter conditions internal to the operation of the vehicle, and operable in response to said first, second, external parameter and internal parameter signals to calculate a maximum allowable engine torque for the engine of the vehicle using longitudinal dynamics equations for the vehicle and based at least in part upon the mass of the vehicle and the slope of the road on which the vehicle is to travel; and
the processor being operable to produce an output that controls the fueling of the engine to selectively limit the maximum torque of the vehicle engine to the calculated maximum allowable torque under engine operating conditions wherein the engine is not under the control of a vehicle cruise control system.

35. An apparatus according to claim 34 comprising a GPS receiver and a 3-dimensional map database coupled to the processor to provide the second signal corresponding to the slope of the upcoming road.

36. An apparatus according to claim 35 wherein the processor is programmed to predictively determine the slope of the road for a plurality of upcoming road segments where the vehicle is to travel and in the expected direction of travel by the vehicle.

37. An apparatus according to claim 36 wherein the processor is programmed to be responsive to speed limit data corresponding to speed limits associated with the plurality of upcoming road segments where the vehicle is to travel and in the expected direction of travel by the vehicle and is operable to calculate a maximum allowable engine torque based at least in part upon the respective speed limit for the upcoming road segments.

38. An apparatus according to claim 34 wherein the internal and external parameter signals correspond to parameters comprising at least each of the following parameters:

| Parameter | Description |
| --- | --- |
| | Drivetrain Efficiency |
| | Rear Axle Ratio |
| | Transmission Gear Ratio |
| | Dynamic Radius of Wheels |
| | Engine Torque |
| | Engine Friction Torque |
| | Engine Brake Torque |
| | Service Brake Force at the Wheel |
| | Total Engine Inertia |
| | Total Wheel Inertia |
| | Vehicle Acceleration |
| | Vehicle Drag Coefficient |
| | Vehicle Frontal Area |
| | Air Density |
| | Vehicle Velocity |
| | Wind Velocity |
| | Crr (Coefficient of Rolling Resistance). |

39. An apparatus for establishing the maximum allowable engine torque for a vehicle comprising:
means for determining the mass of the vehicle;
means for determining the slope of the upcoming road on which the vehicle is to travel;
means for calculating a maximum allowable engine torque for the engine of the vehicle using longitudinal dynamics equations for the vehicle and based at least in part upon the determined mass of the vehicle and the slope of the road on which the vehicle is to travel; and
means for selectively limiting the maximum torque of the vehicle engine to the calculated maximum allowable torque under engine operating conditions wherein the engine is not under the control of a vehicle cruise control system.

* * * * *

UNITED STATES PATENT AND TRADEMARK OFFICE
CERTIFICATE OF CORRECTION

PATENT NO. : 9,020,726 B2
APPLICATION NO. : 12/612536
DATED : April 28, 2015
INVENTOR(S) : Boeckenhoff et al.

It is certified that error appears in the above-identified patent and that said Letters Patent is hereby corrected as shown below:

In the Claims:

Column 28, lines 6-7, claim 18, "information follow" should read -- information to follow --

Column 29, line 33, claim 33, "engine torque curve occurs in the absence of one or more of" should read -- engine torque curve in the absence of one or more of --

Signed and Sealed this
Third Day of May, 2016

Michelle K. Lee
*Director of the United States Patent and Trademark Office*